US012631265B2

(12) United States Patent
Kriegsmann

(10) Patent No.: US 12,631,265 B2
(45) Date of Patent: May 19, 2026

(54) METHODS OF ROBUST ELECTROHYDRAULIC PRESSURE CONTROL WITH DISTRIBUTED DAMPING

(71) Applicant: Sunstream Scientific Incorporated, Chicago, IL (US)

(72) Inventor: Michael Kenneth Kriegsmann, Chicago, IL (US)

(73) Assignee: Sunstream Scientific Incorporated, Chicago, IL (US)

( * ) Notice: Subject to any disclaimer, the term of this patent is extended or adjusted under 35 U.S.C. 154(b) by 142 days.

(21) Appl. No.: 18/195,260

(22) Filed: May 9, 2023

(65) Prior Publication Data

US 2023/0366418 A1 Nov. 16, 2023

Related U.S. Application Data

(60) Provisional application No. 63/340,188, filed on May 10, 2022.

(51) Int. Cl.
| | |
|---|---|
| *F16K 31/42* | (2006.01) |
| *G05D 16/20* | (2006.01) |
| *F15B 13/02* | (2006.01) |
| *F15B 21/00* | (2006.01) |

(52) U.S. Cl.
CPC ....... *F16K 31/426* (2013.01); *G05D 16/2097* (2019.01); *F15B 13/02* (2013.01); *F15B 21/001* (2013.01); *F15B 2211/255* (2013.01); *G05D 16/2024* (2019.01)

(58) Field of Classification Search
CPC .............. F16K 31/426; F16K 31/0689; F16K 31/0696; F16K 31/0662; F16K 31/0665; F16K 31/406; F16K 31/408; F15B 13/02; F15B 13/0403; F15B 21/001; F15B 2211/255; F15B 13/0407; G05D 16/2097; G05D 16/2024
USPC .............. 137/625.61, 625.64, 625.6, 625.68, 137/596.16; 251/129.01–129.22
See application file for complete search history.

(56) References Cited

U.S. PATENT DOCUMENTS

| | | | | | |
|---|---|---|---|---|---|
| 2,913,005 | A | * | 11/1959 | Grant | F16K 31/40 91/417 R |
| 3,868,966 | A | * | 3/1975 | Malygin | B30B 15/142 91/36 |
| 4,202,250 | A | * | 5/1980 | Zeuner | F16K 31/406 91/449 |

(Continued)

*Primary Examiner* — Craig J Price
(74) *Attorney, Agent, or Firm* — Quarles & Brady LLP

(57) ABSTRACT

Disclosed herein are methods and systems of robust electrohydraulic pressure control with distributed damping. The system includes a two-stage pilot operated electrohydraulic pressure reducing-relieving valve have a valve body with a high-pressure port, a low-pressure port, and a variable working pressure port. A valve spool is disposed within the valve body to direct oil flow into and out of a working volume, and a pilot subassembly is also disposed within the valve body to generate a pilot pressure and create a hydraulic motive force to operate the valve spool. A linear electromagnetic actuator is operatively coupled to the pilot subsystem to generate an electromotive force to operate the pilot assembly. The system further includes a fluid path that restrictively communicates a common fluid pressure to a volume of fluid defined by a position of the linear electromagnetic actuator.

34 Claims, 14 Drawing Sheets

(56)                  References Cited

U.S. PATENT DOCUMENTS

| | | | | |
|---|---|---|---|---|
| 4,305,566 A * | 12/1981 | Grawunde | F16K 31/406 | 251/44 |
| 4,445,528 A * | 5/1984 | Miki | F16K 31/426 | 137/625.64 |
| 4,567,914 A * | 2/1986 | Coppola | F15B 13/0405 | 137/625.65 |
| 4,746,094 A * | 5/1988 | Cummins | F16K 31/0665 | 251/282 |
| 4,763,872 A * | 8/1988 | Ichihashi | F16K 31/0655 | 251/30.01 |
| 4,809,749 A * | 3/1989 | Ichihashi | F16K 31/0613 | 137/625.68 |
| 4,875,501 A * | 10/1989 | Ichihashi | F15B 13/043 | 251/36 |
| 5,031,663 A * | 7/1991 | Fukuta | G05D 16/2024 | 137/625.69 |
| 5,062,454 A * | 11/1991 | Ichihashi | G05D 16/2097 | 137/550 |
| 5,836,335 A * | 11/1998 | Harms | F15B 13/0402 | 137/596.2 |
| 5,878,647 A * | 3/1999 | Wilke | F16K 31/408 | 137/596.1 |
| 5,984,259 A * | 11/1999 | Najmolhoda | G05D 16/2097 | 251/129.08 |
| 6,814,103 B2 * | 11/2004 | Neuhaus | G05D 16/2024 | 137/625.61 |
| 7,621,211 B2 * | 11/2009 | Ma | F16K 31/406 | 251/30.04 |
| 8,375,992 B2 * | 2/2013 | Reilly | G05D 16/2097 | 137/596.16 |
| 8,397,758 B2 * | 3/2013 | Hillesheim | G05D 16/2024 | 137/625.68 |
| 8,424,836 B2 * | 4/2013 | Ma | F16K 31/406 | 251/44 |
| 8,662,109 B2 * | 3/2014 | Bill | F15B 13/0433 | 137/625.68 |
| 9,599,245 B2 * | 3/2017 | Holmes | F15B 13/0402 | |
| 9,664,300 B2 * | 5/2017 | Zeiner | F16K 15/1826 | |
| 9,726,296 B2 * | 8/2017 | Neubauer | F16K 31/406 | |
| 2008/0169439 A1 * | 7/2008 | Waterstredt | F16K 31/406 | 251/29 |
| 2013/0255809 A1 * | 10/2013 | Bruck | F16K 31/426 | 137/625.6 |
| 2013/0291964 A1 * | 11/2013 | Guse, Jr. | G05D 16/2024 | 137/489 |
| 2014/0026985 A1 * | 1/2014 | Aranovich | F15B 13/0405 | 137/455 |

* cited by examiner

240

METHODS OF ROBUST ELECTROHYDRAULIC PRESSURE CONTROL WITH DISTRIBUTED DAMPING

CROSS REFERENCE TO RELATED APPLICATIONS

This application claims the benefit of U.S. Provisional Application No. 63/340,188, filed on May 10, 2022, and entitled "ROBUST DYNAMIC ELECTROHYDRAULIC PRESSURE CONTROL VALVE," which is hereby incorporated by reference herein in its entirety.

REFERENCE REGARDING FEDERALLY SPONSORED RESEARCH OR DEVELOPMENT

Not applicable

SEQUENTIAL LISTING

Not applicable

BACKGROUND OF THE DISCLOSURE

1. Field of the Disclosure

The present disclosure relates to fluid power pressure control valves, and more specifically to electrohydraulic pilot operated pressure reducing/relieving valves that incorporate linear electro-magnetic actuators as a means to convert electrical current to mechanical force.

2. Description of the Background of the Disclosure

In many fluid power systems, it is desirable to produce work by controlling oil pressure in a cavity of variable volume, or to counterbalance loads, or regulate flow, or any number of functions. Electrohydraulic pressure-reducing relieving valves are the leading economical technology for these purposes, and commercially available from a broad number of suppliers in a broad selection of sizes and configurations. However, these valves are dynamically complex with poorly understood behavior and prone to poor dynamic response.

It is a primary objective of the present invention to provide an economical solution which is fast and demonstrates robust dynamic stability.

SUMMARY OF THE DISCLOSURE

In some aspects, the present disclosure can be generally categorized as a two stage pilot operated, electrohydraulic pressure reducing-relieving (also pressure control) valve comprising a valve body with a high pressure (supply) port, a low pressure (drain) port, and a variable working pressure port; a valve spool disposed within the valve body to direct oil flow into and out of a working volume; a pilot subassembly also disposed within the valve body to generate a pilot pressure creating a hydraulic motive (hydramotive) force to operate the valve spool, and a linear electromagnetic actuator operatively coupled to the pilot subsystem to generate an electromotive force to operate the pilot assembly. Operationally, the pilot assembly amplifies the electromotive force to create a hydramotive force that is significantly higher in magnitude.

It is an object of the present disclosure to provide a fluid power valve which is fast, robust in dynamic stability, reliable, and robust in construction.

It is another object of the present disclosure to demonstrate a means to individually tune the damping characteristics of each dynamic element including, but not limited to, the valve spool, the pilot assembly, and the armature—the armature being the working component of the electromagnetic actuator immediately coupled to the pilot assembly. In pursuit of this objective, a common pressure rail is derived from the high-pressure fluid via a fine mesh filter. This filtered high pressure rail is employed in the dynamic control of the fluid power elements—delivering clean hydraulic fluid to a network of dashpots and the control port of the pilot assembly. It is desirable to utilize high pressure fluid for damping, as the stiffness of hydraulic fluid increases with increasing pressure due to the entrained air common to hydraulic systems. In further pursuit of this objective, a novel architecture is demonstrated that balances all dynamic elements regardless of the magnitude of the high-and low-pressure hydraulic fluid. This architecture is further advantageous in that it reduces the operational envelope of the pilot subsystem thus improving dynamic robustness.

It is yet another object of the present disclosure to attenuate force and motion disturbances on the armature assembly caused by operation of the 2nd stage (main) valve spool. In pursuit of this objective, operative coupling between the armature and the pilot subassembly is achieved not through a rigid transfer rod, but through a compliant spring.

It is still another object of the invention to disclose a strategy to minimize parasitic energy waste while the valve is idle yet provide for rapid response when the valve is operational.

According to some embodiments, a hydraulic valve includes a valve body and a common pressure fluid rail that has a network of fluid passages, and said network receives an incoming pressurized fluid from a common source having a common fluid pressure and distributes/freely communicates the pressurized fluid throughout the valve. The hydraulic valve further includes a solenoid coil and an electromechanical actuator that has a linearly moveable armature element which converts an electrical signal through said solenoid coil into mechanical force and motion. The hydraulic valve further includes a first fluid path conceived to restrictively communicate said common fluid pressure, or a derivative thereof, to a first volume of fluid defined in part by a position of said linear moveable armature element, and motion of said linear moveable armature element induces a pressure differential across said first fluid path to create a damping effect. The hydraulic valve further includes a first fluid metering element which defines a variable fluid path from a second volume of control fluid having a control fluid pressure to a lower pressure reservoir, and a second fluid metering element which is substantially larger than said first fluid metering element is received into said valve body and moveably disposed therein. The hydraulic valve further includes an energizing spring which is arranged so as to transfer the mechanical force produced by said electromechanical actuator to said first fluid metering element via an energizing spring force. A first end of the energizing spring is operatively coupled to the linearly moveable armature element, and an opposing end of said spring is operatively coupled to said first fluid metering element. A first surface is operatively coupled to said first fluid metering element which receives said control fluid pressure, or a derivative thereof, and said control fluid pressure acting upon said first surface creates a first pressure force opposing said energizing spring force. A second surface is operatively coupled to said first fluid metering element which receives said common fluid pressure, or a derivative thereof, and said control fluid pressure acting upon said second surface creates a second pressure force assisting said energizing spring force. A third surface is operatively coupled to said second fluid metering element which receives said control fluid pressure, or a derivative thereof, and said control fluid pressure acting upon said third surface creates a third pressure force energizing said second fluid metering element. A fourth surface is operatively coupled to said second fluid metering element which receives said common fluid pressure, or a derivative thereof, and said control fluid pressure acting upon said fourth surface creates a fourth pressure force opposing the third pressure force.

In some non-limiting examples, the hydraulic valve further includes a piston which receives one end of said energizing spring, and said piston is operatively coupled to said first fluid metering element. The hydraulic valve further includes a second fluid path that restrictively communicates said common fluid pressure, or a derivative thereof, to a third volume of fluid defined in part by a position of said piston, and motion of said piston induces a pressure differential across said second fluid path to create a damping effect. A third fluid path is configured to restrictively communicate said common fluid pressure, or a derivative thereof, to the second volume of fluid defined in part by a position of said first fluid metering element, and motion of said first fluid metering element induces a pressure differential across said third fluid path to create a damping effect. The third volume is additionally defined in part by a position of said first fluid metering element, and motion of said first fluid metering element further induces a pressure differential across the second fluid path. The hydraulic valve further includes a rod which receives one end of said energizing spring, said rod being operatively coupled to said linearly moveable armature element, and a fourth fluid path through said rod. The fourth fluid path is configured to restrictively communicate said common fluid pressure, or a derivative thereof, to the first volume of fluid defined in part by the position of the linearly moveable armature element, and motion of said linearly moveable armature element induces a pressure differential across said fourth fluid path to create a damping effect. The hydraulic valve further includes a fifth fluid path through said rod that is configured to freely communicate said common fluid pressure, or a derivative thereof.

In some non-limiting examples, the hydraulic valve further includes a second fluid path that is configured to restrictively communicate said common fluid pressure, or a derivative thereof, to a third volume of fluid defined in part by a position of said second metering element, and motion of said second metering element induces a pressure differential across the second fluid path to create a damping effect. Said fourth surface partially defines said third volume, and surface areas of said first, second, third, and fourth surfaces are related by:

$$\frac{\text{Area}_{surface3}}{\text{Area}_{surface4}} = \frac{\text{Area}_{surface1}}{\text{Area}_{surface2}}$$

Said electromechanical actuator is a linear proportional solenoid, and the hydraulic valve further includes a filter that receives an inflow of pressurized fluid and communicates an outflow of filtered fluid to said common pressure fluid rail.

In some non-limiting examples, the hydraulic valve further includes a second fluid path conceived to restrictively communicate said common fluid pressure, or a derivative thereof, to the second volume of control fluid, and said second fluid path is blocked, partially blocked, or further restricted when said second fluid metering element is in a de-energized state. In some aspects, said first fluid metering element is a poppet, and the hydraulic valve further includes a poppet seat which receives said poppet. A frustum formed at an interface between said poppet and said poppet seat defines said first surface. In some aspects, the hydraulic valve further includes a flat pilot spring that is arranged such that it suspends said poppet at a fixed distance from said poppet seat when the valve is in a de-energized state, and a stem that is operative coupled to said poppet. Said second surface is a feature of said stem, said second surface being orthogonal to an axis of said stem.

In some non-limiting examples, the hydraulic valve further includes a pilot valve body with a bore, and said pilot valve body is received by said valve body and rigidly disposed therein. In addition, said pilot valve body receives said first fluid metering element and a piston, and said pilot valve body further receives said energizing spring, a rod, and said piston. Said pilot valve body includes a plurality of apertures to provide for fluid flow and a plurality of ports, and a plurality of seals disposed along an outer surface of said pilot valve body prevent leakage of fluid between the ports. A first port freely communicates with said control fluid pressure, a second port freely communicates with a drain pressure, and a third port freely communicates with said common pressure fluid rail. The hydraulic valve further includes a pilot volume of fluid immediately below a pilot seat, and said first surface is redefined such that it receives a pilot volume pressure. A second fluid path restrictively communicates fluid between said pilot volume and the second volume of control fluid, a third fluid path restrictively communicates fluid between said pilot volume and said common pressure fluid rail, and a fourth port freely communicates with said common pressure fluid rail. In some aspects, said valve body includes a low-pressure tank port, a high-pressure supply port, and a working port, and a working port fluid pressure is variable during normal valve operation, being derived from tank pressure and supply pressure.

In some non-limiting examples, said second fluid metering element is a spool which includes a plurality of lands that cooperatively define a bearing surface for efficient axial movement. Said spool further includes a plurality of circumferentially deployed features configured to regulate fluid flow into and out of said working port. In some aspects, a partially energized neutral spool state exists which blocks communication of fluid from said tank port to said working port, and from said working port to said supply port. In some aspects, said neutral spool state permits restrictive communication of fluid from said tank port to said working port, and from said working port to said supply port. In some aspects, said neutral spool state permits free communication of fluid from said tank port to said working port, and from said working port to said supply port. The hydraulic valve further includes a fifth surface that is operatively coupled to said fluid second metering element which receives a working fluid pressure, or a derivative thereof, and said working fluid pressure acting upon said fifth surface creates a fifth pressure force opposing the third pressure force.

According to some embodiments, a hydraulic valve includes an electrical motor stator assembly with a plurality of poles, an electrical motor rotor assembly, a motor housing into which the stator assembly and the rotor assembly are operatively received, and a matching lead screw and threaded nut, or related power screw technology for converting rotary motion to linear motion. The valve further includes a first fluid metering element which defines a variable fluid path from a first volume of control fluid to a lower pressure reservoir, and an energizing spring is arranged so as to convert linear movement generated by said power screw technology into a mechanical force which is transferred to said first fluid metering element. A first surface is operatively coupled to said first fluid metering element which receives said control fluid pressure, the fluid pressure acting upon said first surface to create a pressure force opposing said energizing spring force.

In some non-limiting examples, said electrical motor stator and rotor assembly define a stepper motor assembly, and said stepper motor assembly is a hybrid stepper motor assembly. A pilot body includes a plurality of apertures to provide for fluid flow, and said pilot valve body further includes a plurality of ports. A plurality of seals is disposed along the outer surface of said pilot body prevent leakage of fluid between the ports. Said pilot valve body has a bore and receives said first fluid metering element and said energizing spring. In addition, said first fluid metering element is a poppet. In some aspects, the hydraulic valve further includes a poppet seat that receives said poppet, and the frustum formed at the interface between said poppet and said poppet seat defines said first surface. The hydraulic valve further includes a flat pilot spring which is arranged such that it suspends said poppet at a fixed distance from said poppet seat when the valve is in a de-energized state. The lead screw is rigidly coupled to said rotor assembly, and said nut, received by said screw, translates along the axis of said screw such that said screw nut is configured to be un-rotatable. In some aspects, the hydraulic valve further includes a piston, and said piston and said screw nut cooperatively capture said energizing spring. Said piston is operatively coupled to said first fluid metering element.

In some non-limiting examples, the hydraulic valve further includes a common pressure fluid rail that is defined by a network of fluid passages, and said network receives an incoming pressurized fluid from a common source, and distributes/freely communicates the pressurized fluid throughout the valve. A second surface, operatively coupled to said first fluid metering element, receives said control fluid pressure, the fluid pressure acting upon said second surface to create a pressure force assisting said energizing spring force. The hydraulic valve further includes a fluid path that is configured to restrictively communicate said common fluid pressure, or a derivative thereof, to a second volume of fluid defined in part by the position of said piston, and motion of said piston induces a pressure differential across said restricted fluid path to create a damping effect. The valve further includes a valve body, and a second fluid metering element, substantially larger than said first fluid metering element, is received into said valve body and moveably disposed therein.

In some non-limiting examples, the valve further includes a third surface, operatively coupled to said second metering element, which receives said control fluid pressure, or a derivative thereof, and said pressure acting upon said third surface creates a third pressure force energizing said second fluid metering element. The valve further includes a fourth surface, operatively coupled to said second metering element, which receives said common fluid pressure, or a derivative thereof, and said pressure acting upon said fourth surface creates a fourth pressure force opposing the energizing third pressure force. In some aspects, said valve body includes a low-pressure tank port, a high-pressure supply port, and a working port, and said working port fluid pressure is variable during normal valve operation, being derived from tank pressure and supply pressure. In some aspects, said second fluid metering element is a spool. The valve further includes a fifth surface, operatively coupled to said second metering element, which receives said working fluid pressure, or a derivative thereof, and said pressure acting upon said fifth surface creates a fifth pressure force also opposing the energizing third pressure force.

In some non-limiting examples, said motor housing is defined by an upper motor housing and a lower motor housing, and the upper and lower motor housings joined together and properly disposed in the intended application cooperatively define a sealed volume of fluid into which both stator and rotor assemblies are operatively disposed. The valve further includes a pilot valve body that is received into said lower motor housing, and said pilot valve body includes a plurality of apertures to provide for fluid flow. In some aspects, said pilot valve body further includes a plurality of ports, wherein a plurality of seals disposed along the outer surface of said pilot body prevent leakage of fluid between the ports. Said power screw is rigidly coupled to said rotor assembly. Said screw nut, received by said screw, translates along the axis of said screw, and said pilot valve body is conceived to comprise one or more longitudinal internal groves, or keyways, along the bore of said pilot valve body. In some aspects, said screw nut is conceived to comprise one or more rails, or integral keys, disposed longitudinally along the external nut diameter, and said rails are arranged to be received into said longitudinal internal groves and said arrangement prevents rotation of said screw nut with respect to said pilot valve body. In some aspects, said screw nut is configured to comprise one or more grooves, or keyseats, disposed longitudinally along the external nut diameter such that each groove receives a common mating key, and said arrangement prevents rotation of said screw nut with respect to said pilot valve body.

In some non-limiting examples, the valve further includes a piston, and said piston and said screw nut cooperatively capture said energizing spring. In some aspects, said piston is operatively coupled to said first fluid metering element, an upper bearing, and a lower bearing. said power screw is further defined as including a prolonged smooth diameter that receives said upper bearing, said lower bearing, and said rotor assembly, a length of ACME threads that receives a screw nut, and a terminal smooth diameter that externally receives and guides a piston. Said screw terminus features intersecting orthogonal fluid passages, and a cylindrical cavity formed within the upper motor housing receives the outer race of said upper bearing, thereby locating said bearing axially. In some aspects, a cylindrical cavity and shoulder, or counter bore, formed within the upper portion of said pilot valve body, receives the outer race of said lower bearing, thereby locating said bearing axially and vertically. Said power screw further receives said upper bearing spacer, said upper spacer operatively disposed between said upper bearing and said rotor assembly, and said power screw receives said lower bearing spacer, this arrangement of spacers thereby locating the vertical position of said rotor assembly vertically. Said pilot valve body receives said energizing spring, said screw nut, said piston, and said first metering element.

In some non-limiting examples, the valve further includes a valve body which includes a low-pressure tank port, a high-pressure supply port, and a working port, and said working port fluid pressure is variable during normal valve operation, being derived from tank pressure and supply pressure. The valve further includes a second fluid metering element that is substantially larger than said first fluid metering element and is received into said valve body and moveably disposed. The valve further includes a second surface operatively coupled to said second metering element which receives said control fluid pressure, or a derivative thereof, and said pressure acting upon said second surface creates a second pressure force energizing said second fluid metering element. The valve further includes a third surface, operatively coupled to said second metering element which receives said working fluid pressure, or a derivative thereof, and said pressure acting upon said third surface creates a third pressure force also opposing the energizing second pressure force. In some aspects, the hydraulic valve further includes a common pressure fluid rail which is defined by a network of fluid passages, and said network receives an incoming pressurized fluid from a common source and distributes/freely communicates the pressurized fluid throughout the valve. The valve further includes a fourth surface, operatively coupled to said first fluid metering element which receives said common fluid pressure, the fluid pressure acting upon said fourth surface to create a pressure force assisting said energizing spring force. The valve further includes a fifth surface operatively coupled to said second metering element which receives said common fluid pressure, or a derivative thereof, wherein said pressure acting upon said fifth surface creates a fifth pressure force opposing the energizing second pressure force.

In some non-limiting examples, the valve further includes a fluid path which is formed in series by features within said piston and within said power screw, is conceived to restrictively communicate said common fluid pressure, or a derivative thereof, to a third volume of fluid defined in part by the position of said piston relative to the terminus of said power screw. Motion of said piston induces a pressure differential across said restricted fluid path to create a damping effect. The valve further includes a compound non-conductive bobbin that encapsulates said stator poles, and said bobbin supports a plurality of coil windings cooperatively defining a coil array. The valve further includes an electrical board, wherein said electrical board is received by features of said bobbin and rigidly disposed, and said electrical board provides a means to terminate said coil windings. The valve further includes an electrical connector, said connector providing a conducting means for an external controller to electrically communicate with said coil array, and a flex cable, or related technology, which communicates the motor electrical signals from said electrical board to said connector. In some aspects, said motor housing is defined by an upper motor housing, a lower motor housing, and a non-magnetic sleeve, and the arrangement of parts joined together and properly disposed in the intended application cooperatively define a sealed volume of fluid into which the rotor assembly is operatively disposed, and the stator assembly is isolated. In some aspects, the sleeve is non-magnetic and non-conductive. In some aspects, the valve further includes a pilot valve body that is received into said lower motor housing, and said pilot valve body receives the lower open end of said non-magnetic sleeve. In some aspects, the joint between said sleeve and said valve body is sealed.

DETAILED DESCRIPTION OF THE DRAWINGS

The present disclosure is directed to fluid power pressure control valves, and more specifically to electrohydraulic pilot operated pressure reducing/relieving valves that incorporate linear electro-magnetic actuators as a means to convert electrical current to mechanical force. Throughout the disclosure, the terms "about" and "approximately" refer to a range of values ±5% of the numeric value that each term precedes. As noted herein, all ranges disclosed within this application are inclusive of the outer bounds of the range.

For purposes of the present disclosure, RI refers to a restriction, the sixth fluid path, communicating oil between filtered pressure common rail and valve spool bias and damping volume V1, R2 refers to a restriction communicating oil between filtered pressure common rail and armature damping volume V2, R3 refers to a restriction communicating oil between filtered pressure common rail and stator damping volume V3, R4 refers to a restriction communicating oil between filtered pressure common rail and pilot bias and damping volume V4, R5 refers to a restriction communicating oil between filtered pressure common rail and control volume V6 when valve is in idle mode, R6 refers to a restriction, the seventh fluid path, communicating oil between filtered pressure common rail and control volume V6 when valve is in operating mode, an oil transmission path through a rod communicates oil between pilot oil volume V7 and restrictions R3 and R2, R8 refers to a restriction, the ninth fluid path, communicating oil between filtered pressure common rail and poppet volume V8, and R9 refers to a restriction, the eighth fluid path, communicating oil between the poppet volume V8 and the control volume V6.

Further, P refers to a high pressure supply oil associated with port P and supply valve with high pressure oil, W refers to variable working pressure oil associated with port W, C refers to variable control pressure oil associated with control volume V6, T refers to low pressure tank oil associated with port T and relieving oil through spool valve to a reservoir, D refers to low pressure drain oil associated with port D and relieving oil through pilot valve to a reservoir, and F refers to high pressure filtered oil associated with a filtered pressure common rail receiving high pressure oil from port P by means of a filter element and delivering filtered oil F to a network of control volumes.

Figure 1:
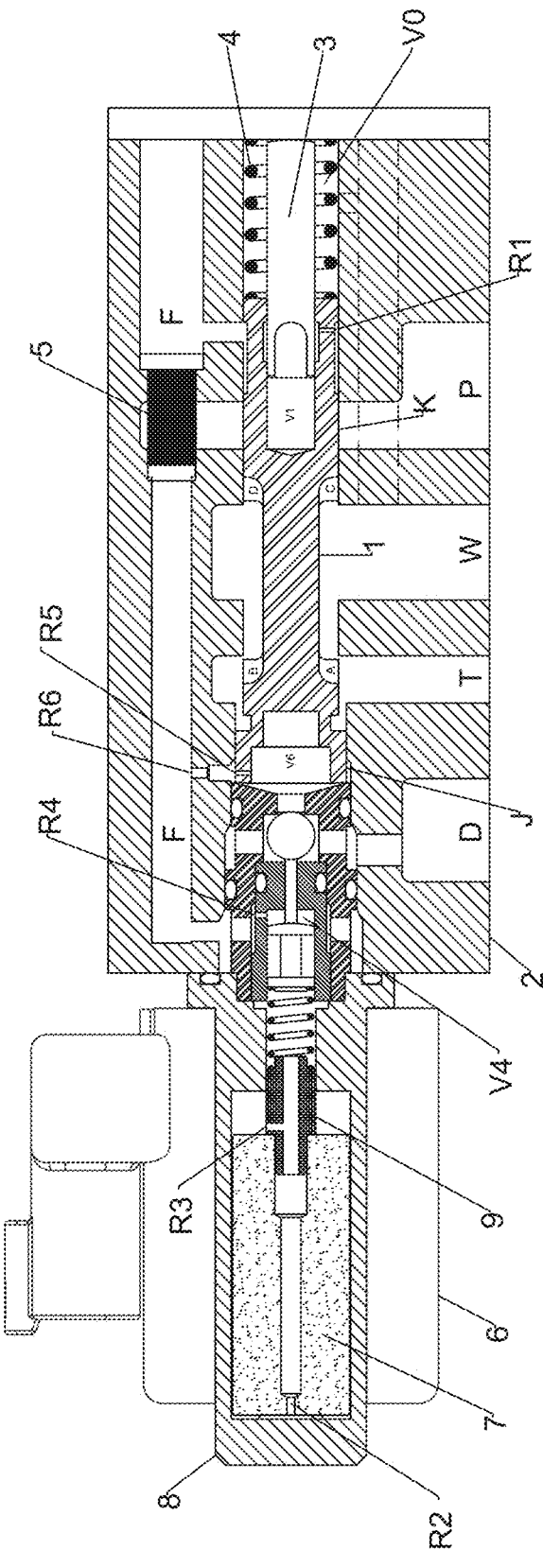
FIG. 1 is a cross-sectional view of a linear solenoid energized electrohydraulic pressure control valve including pressure biased spool and pilot stages and distributed damping.

Referring now to the figures, FIG. 1 illustrates an electrohydraulic pressure control valve assembly, in which the flow of pressurized hydraulic fluid through the valve is directed by a valve spool 1, disposed within a valve body 2, and energized by a hydraulic motive force generated by an electrohydraulic pilot valve. The electrohydraulic pilot valve comprises two coupled subassemblies, such as a linear electromagnetic actuator and a pilot valve subassembly.

The valve body 2, into which the valve spool 1 is received and movably disposed, includes a high-pressure inlet port P, a low pressure drain port D, a low pressure tank port T, and a working pressure port W. A spool bias pin 3 isolates a variable, cylindrical spool bias volume V1 from a spool feedback volume V0. Oil is communicated between bias oil volume V1 and filtered pressure common rail F via restriction R1, formed within valve spool 1, and in series with an oil transmission path through features formed in valve spool 1 and in spool bias pin 3.

A valve spring 4, deployed within feedback volume V0 and encircling bias pin 3, ensures a reliable valve spool return when the coil is de-energized. Working oil pressure in port W is freely communicated to feedback volume V0 by means of an oil transmission path L1.

The valve body further comprises a high-pressure common rail F that supplies high pressure filtered fluid to a pilot control port C and a plurality of damping volumes V1, V2, V3, and V4 naturally arranged within the valve and recruited to dissipate excess kinetic energy of movable valve elements. A fine mesh oil filter 5 communicates oil from high pressure port P to common rail F. Filter 5 is rigidly arranged within valve port P in a manner that minimizes the accumulation of silt and debris on filter surfaces.

The valve spool 1 has a plurality of lands J, M and K, which act as a bearing guide for axial movement, and more significantly, to control the flow of fluid through the valve through a plurality of metering slots A, B, C and D deployed circumferentially about said valve spool lands. Metering slots A and B regulate oil flow between Port T and Port W, and metering slots C and D regulate oil flow between port P and port W.

Figure 2:
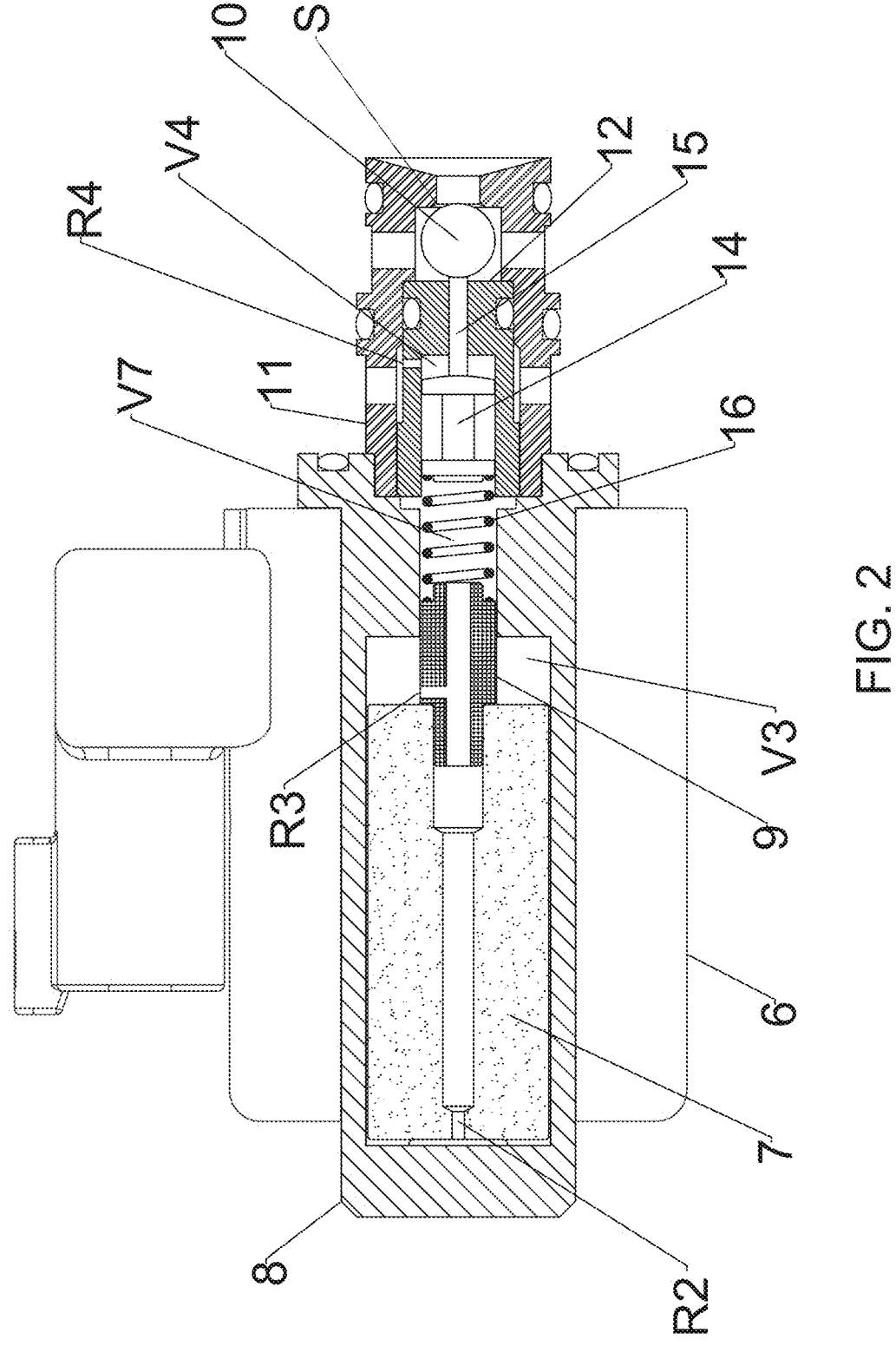
FIG. 2 is a detail view of an example linear solenoid energized and pressure biased pilot valve in a de-energized condition, including a ball type metering element and individually tunable damping volumes.
Figure 5:
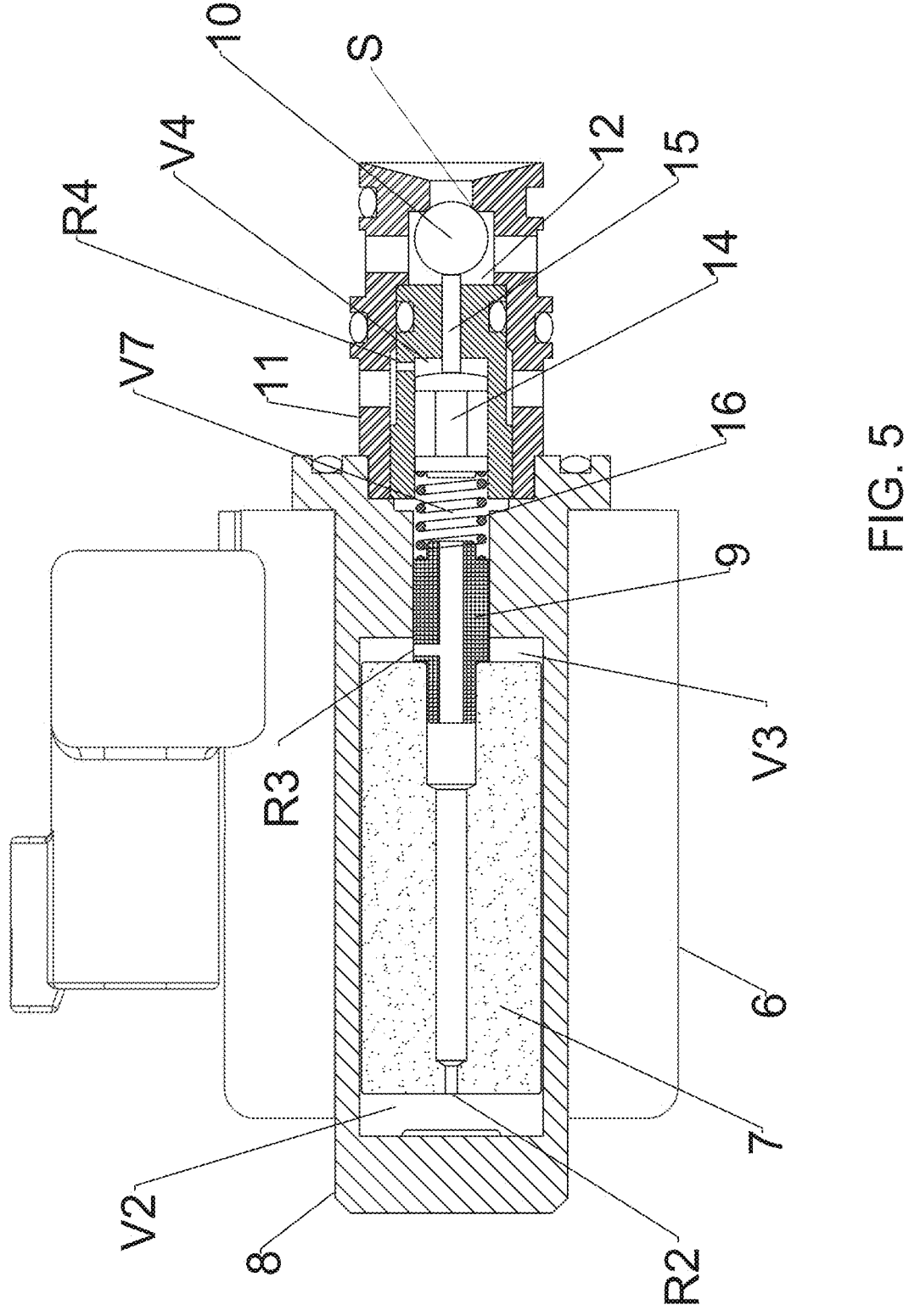
FIG. 5 is a detail view of the pilot valve of FIG. 2 in an energized condition.

Referring now to FIGS. 2 and 5, detail views are illustrated of the pilot assembly. The linear electromagnetic actuator comprises a coil assembly 6, an armature (e.g., a plunger) 7, a solenoid tube (e.g., a stator) 8, and a rod 9 all deployed concentrically along a shared axis. In this way, the armature is received within a cylindrical cavity of the stator tube and movably disposed, and the stator tube is received within the ID of the coil assembly and rigidly disposed. The coil assembly 6, armature 7 and stator 8 cooperatively define a variable air gap that completes a magnetic circuit which generates a working electromotive force when energized. Oil is communicated between an armature oil volume V2 and filtered pressure common rail F via restriction R2, formed within armature 7, and in series with an oil transmission path through features formed in rod 9. Oil is communicated between a stator oil volume V3 and filtered pressure common rail F via restriction R3, formed within rod 9, and in series with an oil transmission path through features formed in rod 9.

The pilot valve comprises a pilot poppet 10 received within a pilot cage 11 and movably disposed therein, and a pilot damping assembly is also received within the pilot cage 11. The pilot damping assembly comprises a guide 12, rigidly disposed within pilot cage 11, and a piston 14 and a pin 15 both received within the guide and movably disposed therein. Oil is communicated between a piston oil volume V4 and filtered pressure common rail F via restriction R4, formed within guide 12, and in series with an oil transmission path through pilot cage port F. Oil is communicated freely between a pilot oil volume V7 and filtered pressure common rail F via an oil transmission path through features formed in pilot cage 11 and guide 12.

When the valve is de-energized, oil is communicated between a control oil volume V6 and filtered pressure common rail F via an idle mode restriction R5, formed within valve spool 1, and in series with an operating mode restriction R6 formed in valve body 2. When the valve is energized, oil is communicated between a control oil volume V6 and filtered pressure common rail F directly via restriction R6. In this way, the series restricted path in the de-energized condition dramatically reduces pilot leakage when the valve is not in use.

The pilot cage 11 includes a plurality of ports providing oil communication paths for low pressure drain fluid D, high pressure filtered fluid F, and variable control pressure C corresponding to volume V6. A plurality of o-ring seals disposed along pilot cage 11 and guide prevents leakage of pressurized fluid between the ports. A pilot energizing spring 16 operatively couples armature 7 and pilot piston 14.

Referring now to the non-limiting example illustrated in FIG. 1, the solenoid tube is joined to valve body 2 by common fastening methods, and the coil assembly and solenoid tube are secured together by conventional methods. The pilot cage is then joined to a receiving cavity in the solenoid tube. However, in some aspects, the pilot cage is received and rigidly disposed within the valve cavity, and the solenoid tube is joined to one or more surfaces of the pilot cage.

In some aspects, land K isolates the high pressure port P from working port W, and land J permits communication of fluid from working port W to tank port T. A return spring 4 biases the valve in the direction of the pilot assembly until the perimeter of land J engages the conical surface of pilot cage 11. Once these surfaces are engaged, common rail F communicates high pressure filtered oil to pilot control port C exclusively through a restriction R5, or orifice, formed within valve spool land J. Said restriction is sized in order to minimize quiescent oil flow when the valve is in an idle, de-energized state.

Figure 3:
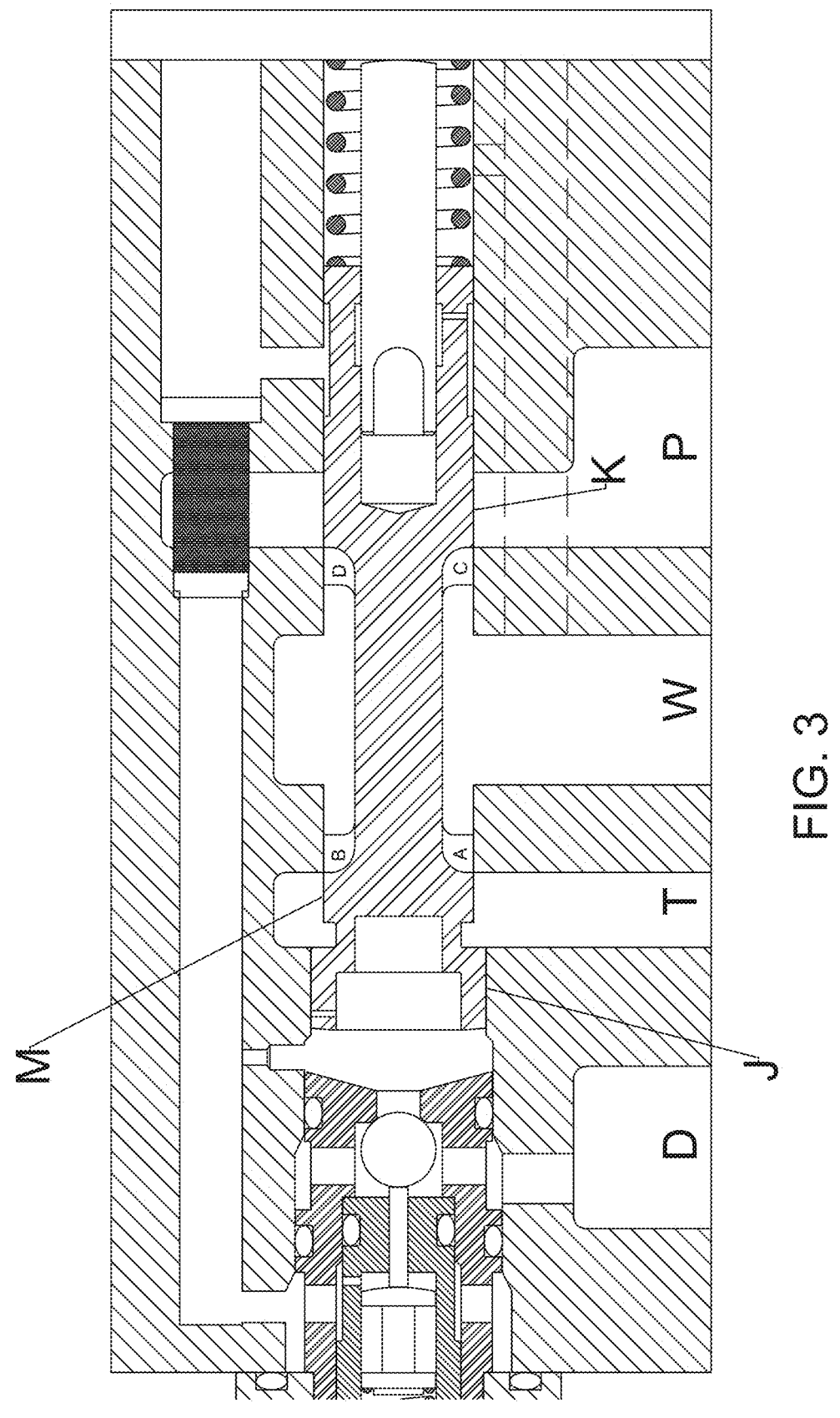
FIG. 3 is a detail view of the electrohydraulic pressure control valve of FIG. 1 illustrating a conventional "closed center" version of a spool in a centered condition.

In the neutral position of the valve spool 1, as illustrated in FIG. 3, land M restricts oil flow between working port W and low pressure port T, and land K restricts oil flow between working port W and high pressure port P. This arrangement of spool lands and metering slots is conventionally known as closed center. Working pressure W is defined by a function comprising high pressure P and low-pressure T and coefficients $K_{IN}$, defined by the transmissibility of oil between port W and port T, and $K_{OUT}$ defined by the transmissibility of oil between port W and port P.

$$W = \frac{K_{IN}^2 P + K_{OUT}^2 T}{K_{IN}^2 + K_{OUT}^2}$$

When $K_{IN}=K_{OUT}$, pressure $W=0.5*(P+T)$. However, when the working volume W is static, small deviations in valve spool position from neutral result in dramatic changes in the ratio between $K_{IN}$ and $K_{OUT}$ and thus correspondingly large changes in working pressure W.

Figure 4:
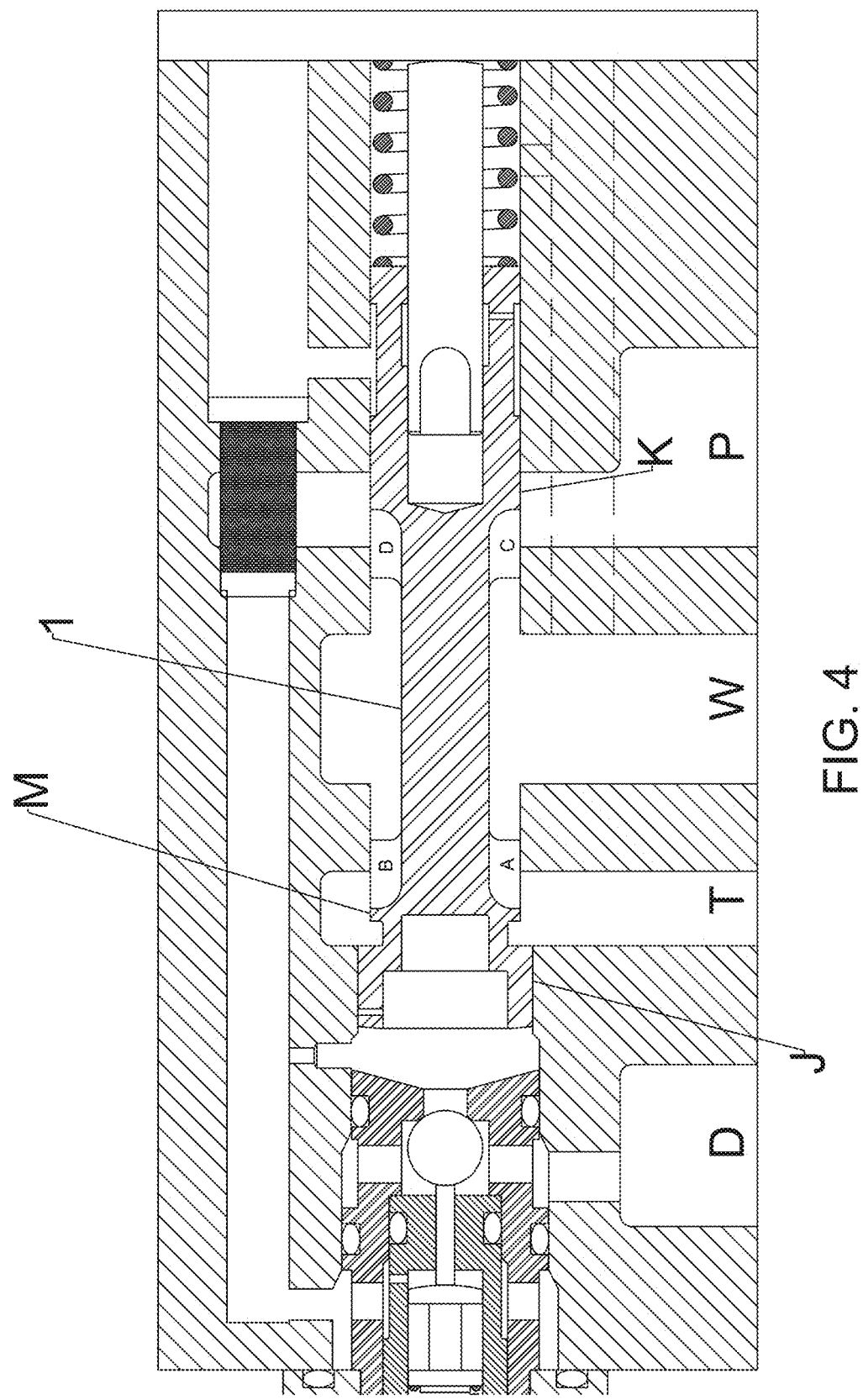
FIG. 4 is a detail view of the electrohydraulic pressure control valve of FIG. 1 illustrating an "open center" version of the spool in a centered condition.

Referring now to FIG. 4, a neutral position of the spool 1 is illustrated. In the neutral position, metering slots A and B disposed within land M communicate oil flow between working port W and low-pressure port T, and metering slots C and D disposed within land K communicate oil flow between working port W and high pressure port P. Conventionally, this arrangement of spool lands and metering slots is referred to as an "open center" configuration. Advantageously, the open center spool architecture yields a pressure curve significantly less sensitive to spool position at the expense of higher energy loss due to cross port oil flow.

By energizing coil 6, a magnetic field is generated through the stator and armature that attracts the armature to the stator pole face. FIG. 5 illustrates the energized armature shifted toward the stator pole and transferring electromotive force to pilot piston 14 by mechanical means of compressing pilot spring 16. As armature 7 moves in the direction of the pilot assembly, armature volume V2 is caused to expand, while stator volume V3 is caused to contract. Oil flow must be drawn through restriction R2 to fill expanding armature volume V2, and oil flow must be forced through restriction R3 in order to vent contracting volume V3. Accordingly, said oil flow throttling generates dynamic pressure perturbations that resist (i.e., dampen), the motion of armature 7, and delay the mechanical force transferred to piston 14. When the pilot system is in equilibrium, the electromotive force transferred mechanically to piston 14 is described as:

$$F_{emf}=k_{spring}(\Delta x_{armature}-\Delta x_{piston})$$

By design, operative travel of armature 7 is much greater than operational travel of piston 14 (and by method of rigid mechanical train, the operational travel of poppet 10) and thus the mechanical force transferred to the piston can be estimated as:

$$F_{spring}\approx\Delta x_{armature}k_{spring}$$

Movement of piston 14 in the direction away from the armature causes piston volume V4 to be contracted, with oil in said contracting volume being forced through restriction R4. This throttling effect in turn generates a backpressure that resists, or dampens, motion of piston 14, and thus delays the mechanical force transferred to poppet 10 through pin 15. Pilot piston 14 not only transfers the spring force to the pilot pin 15, but also isolates piston volume V4 from pilot volume V7 thus forcing oil through restriction R4 for greatest damping effect. Oil pressure in poppet volume V4 also works against the cross-sectional area of pin 15 to transfer a secondary hydramotive force to pilot poppet 10 that assists the spring 16 force.

The force imparted on pilot poppet 10 by pin 15 causes the poppet to move in the direction of the pilot seat S, thus restricting flow of oil from control volume V6 to low pressure drain D, thus increasing pressure in control volume V6. The pilot poppet reaches equilibrium when the control pressure working against the area of the poppet seat S is balanced by the control force imparted upon the poppet by the pilot pin. It will be understood that in the static operating condition, fluid pressure in piston volume V4 is equal to common rail pressure F, which is equal to the high pressure supply.

$$P_{control}\text{Area}_{poppet\ seat}=F_{emf}+P_{supply}\text{Area}_{pin}$$

Figure 6:
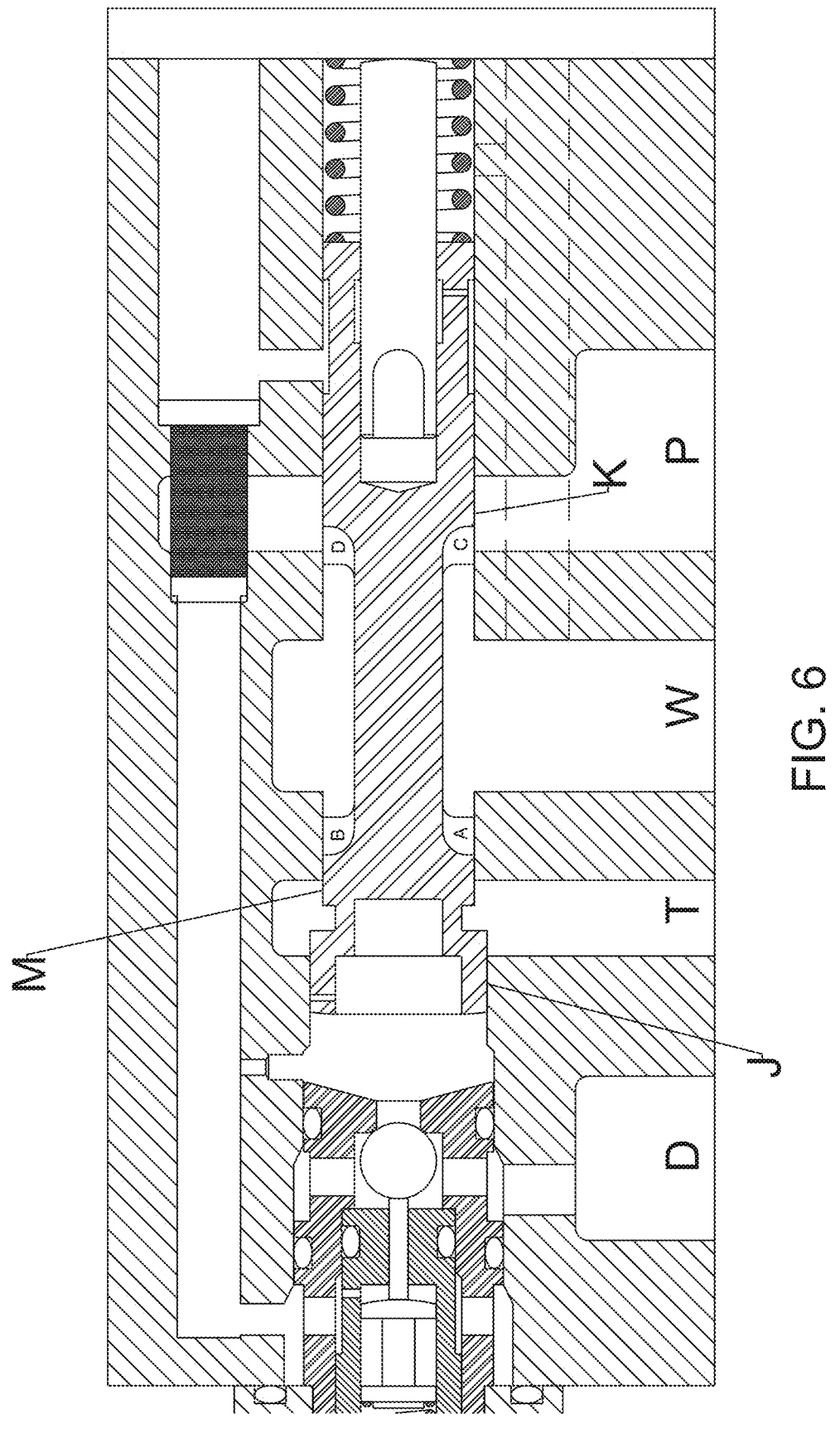
FIG. 6 is a detail view of the electrohydraulic pressure control valve of FIG. 1 illustrating a conventional "closed center" version of the spool in an energized condition.

FIG. 6 illustrates spool travel sufficient to communicate high pressure P to working port W, thus increasing the fluid pressure in working port W. When valve spool 1 is shifted away from the pilot assembly as illustrated in FIG. 6, and in response to increasing control pressure C in control volume V6, metering slots A and B begin restricting the oil flow path between low pressure tank port T and working pressure port W. With sufficient travel, metering slots C and D permit communication of fluid from high pressure port P to working pressure port W.

Movement of valve spool 1 in the direction away from the pilot valve causes spool bias volume V1 to be contracted, with oil in said contracting volume being forced through restriction R1 to common rail F in order to accommodate spool motion. This throttling effect generates a backpressure that resists, or dampens, motion of valve spool 1, and thus delays charging of working port W.

This motion of valve spool 1 further causes an expansion of control oil volume V6. As volume V6 expands with positive spool motion, pilot poppet 10 must adjust accordingly (i.e., shifting further toward poppet seat S) in order to maintain the desired control pressure setting. The conceived arrangement of the pilot valve assembly is optimized to maintain pilot control pressure C when pilot control volume V6 is rapidly contracting and expanding as valve spool 1 translates linearly in order to meter fluid into and out of working port W. Armature 7, to which the pilot poppet is operatively coupled through a mechanical chain, is two orders of magnitude more massive than the collective mass of pilot poppet 10, pilot pin 15, and pilot piston 15 moving in unison. Further, the maximum distance of armature movement is an order of magnitude higher than the maximum distance of poppet movement. Consequently, with proper design procedures, the electromotive force transferred by spring 16 from armature 7 to pilot poppet 10 is functionally constant in the presence of poppet perturbations.

Valve spool 1 reaches equilibrium when control pressure C working against the control area of valve spool 1 is balanced by the working pressure W imparted upon the feedback area of valve spool 1, the pressure force imparted against the bias area of the valve spool, and the force exerted by valve spring 4 as it compresses in response to spool translation. Note that in the static operating condition, fluid pressure in spool bias volume V1 is equal to common rail pressure F, which is equal to the high pressure supply. Ignoring the valve spring force which can be mitigated with proper calibration:

$$P_{control}\text{Area}_{valveC}=P_{working}\text{Area}_{feedback}+P_{supply}\text{Area}_{bias}$$

If the following design relations are employed:

$$\frac{\text{Area}_{control}}{\text{Area}_{bias}} = \frac{\text{Area}_{poppet}}{\text{Area}_{pin}}$$

All terms for $P_{supply}$ cancel, and working pressure can be estimated using the following equation:

$$P_{working} = \frac{\text{Area}_{control}}{(\text{Area}_{poppet\ seat})(\text{Area}_{feedback})}F_{emf}$$

Restrictions R1, R2, R3, and R4 are collectively sized to optimize dynamic performance.

Figure 7:
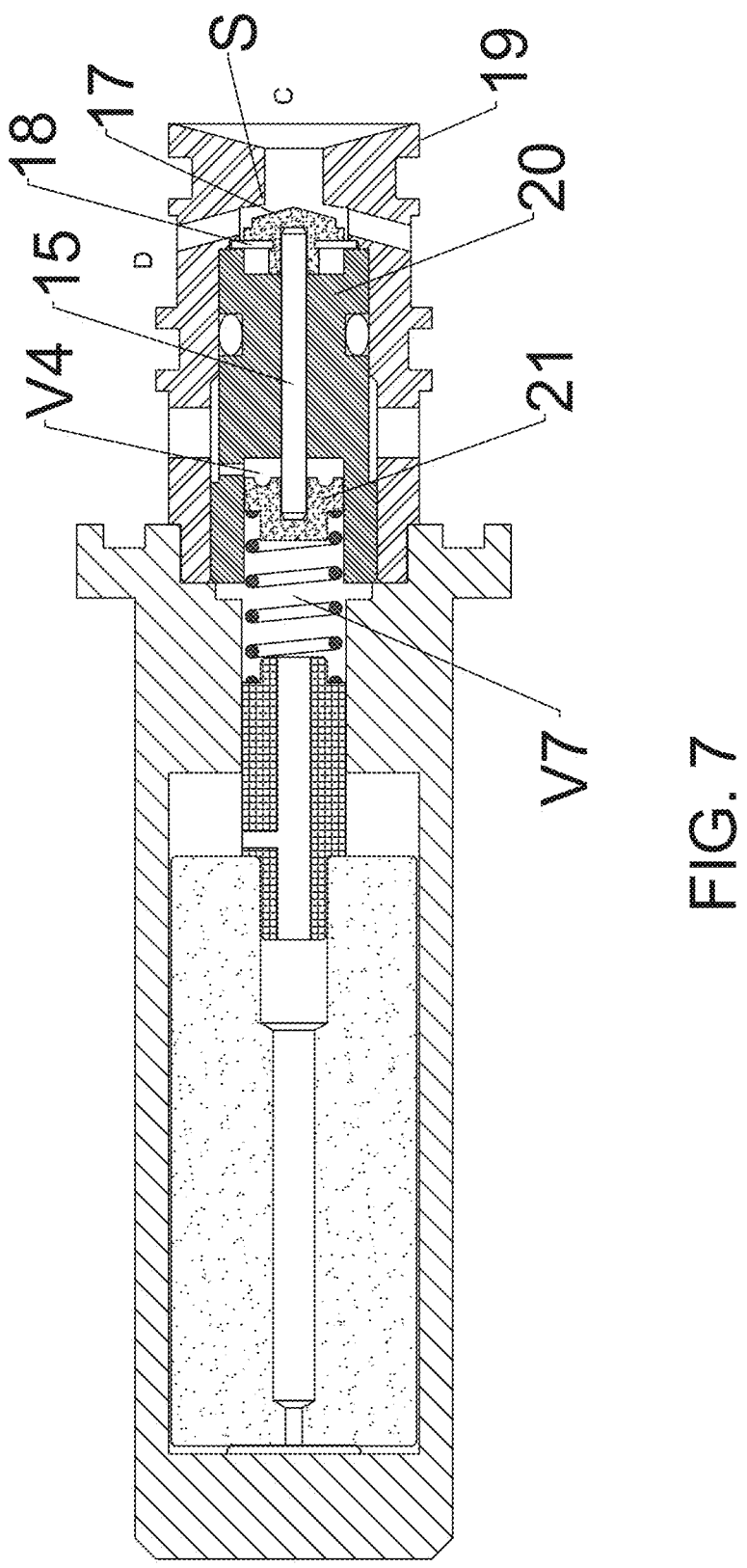
FIG. 7 is a detail view of another example pilot valve, including a poppet type metering element.

Referring now to FIG. 7, a detail view is illustrated of another example pilot subassembly. In some aspects, a conical pilot poppet 17 is used instead of a spherical pilot poppet. In some aspects, the use of a the conical pilot poppet 17 lowers moving mass and provides a more determinative flow path from cage port C to cage port D. Conical poppet 17 is coupled to a flat flexure spring 18, and flexure spring 18 is received in a cavity formed between cage 19 and guide 20. Said flexure spring 18 aligns the conical surface of poppet 17 with pilot seat S and impedes poppet rotation while permitting free axial play of the poppet. An alternative pilot piston 21 design is proposed which has lower mass and requires less space. The pilot piston is illustrated as a solid carrier, although it is contemplated that many possible forms and arrangements of the pilot system exist. For example, the pilot piston could be arranged as a thin walled drawn piston or even a flexible diaphragm piston capable of achieving the dual functions of transferring force of pilot spring 16 to pilot pin 15 and to isolate pilot volume V7 from piston volume V4.

Figure 8:
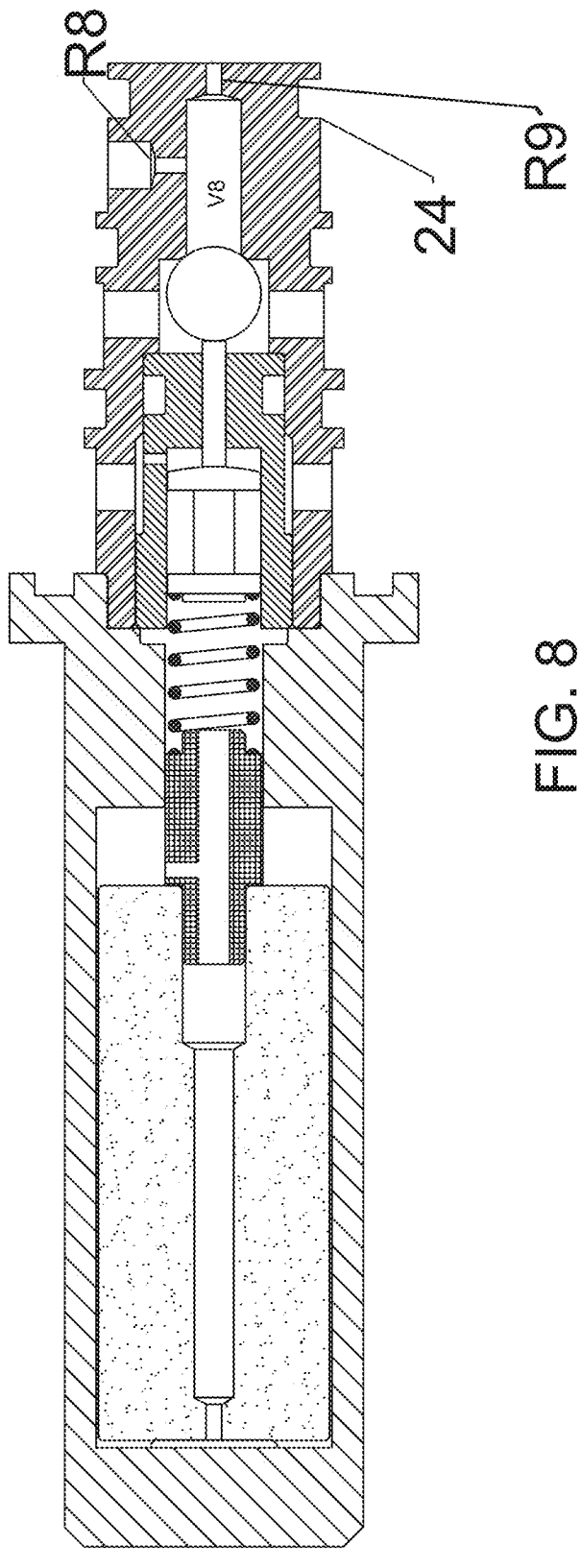
FIG. 8 is a detail view of yet another example pilot valve, utilizing a method of isolating pilot oil volume from the spool energizing oil volume.

Referring now to FIG. 8, yet another example pilot subassembly is illustrated, utilizing a method of isolating pilot oil volume from the spool energizing oil volume. A fourth pilot valve port is added, creating a second pilot oil volume or poppet volume V8 that is dynamically isolated from control volume V6 by an oil restriction R9. Oil is communicated between poppet oil volume V8 and filtered pressure common rail F via R8, formed within pilot cage 24. The pilot poppet 10 receives a pressure force, the sixth pressure force, from the poppet volume V8 opposing the force transferred by pilot spring 16. In this way, dynamic response can be enhanced.

Figure 9A:
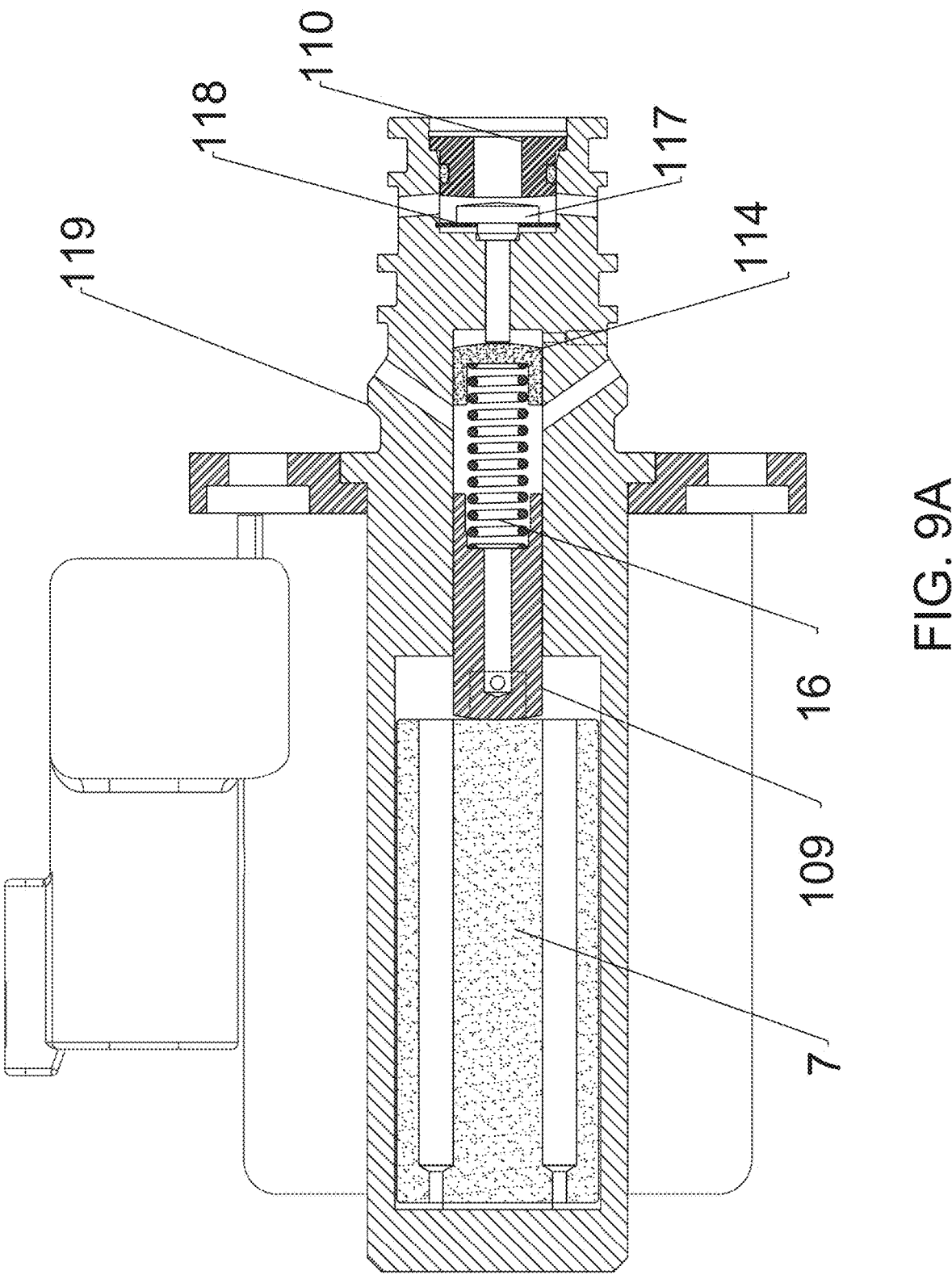
FIG. 9A is a detail view of still another pilot valve.

Referring now to FIG. 9A, still another example pilot subassembly is illustrated. FIG. 9A illustrates the de-energized armature shifted away from the stator pole with a pilot spring 16 nested coaxially between an armature push rod 109 and a pilot piston 114. The push rod 109 is free floating and is received within a first cylindrical cavity in cage 119 along with the pilot piston.

A conical, or truncated conical, pilot poppet 117 includes multiple coaxial features, such as a stem that is received within a second cylindrical cavity in cage 119. In some aspects, the conical pilot popper is used instead of the pilot poppet 17 and pilot pin 15 as illustrated in FIG. 7. Still referring to FIG. 9A, the pilot poppet 117 is coupled to a flat flexure spring 118 by means of an array of features 001, arranged around the innermost perimeter of the flexure spring, which engage and secure to the stem of pilot poppet 117. A second array of features 002, arranged around the outermost perimeter of flexure spring 118, locks the perimeter features into a receiving groove 003 formed within a third cylindrical cavity of cage 119.

Figure 9B:
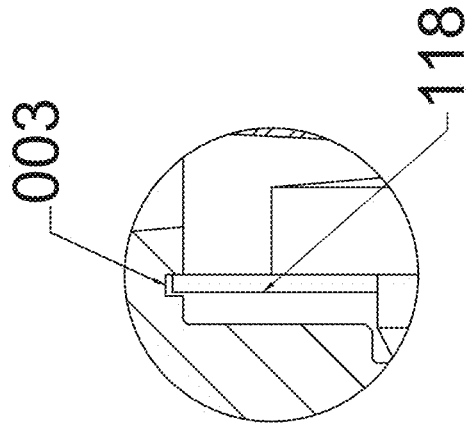
FIG. 9B is a detail view of a flat spring that suspends a poppet element in the pilot valve of FIG. 9A.
Figure 9B:
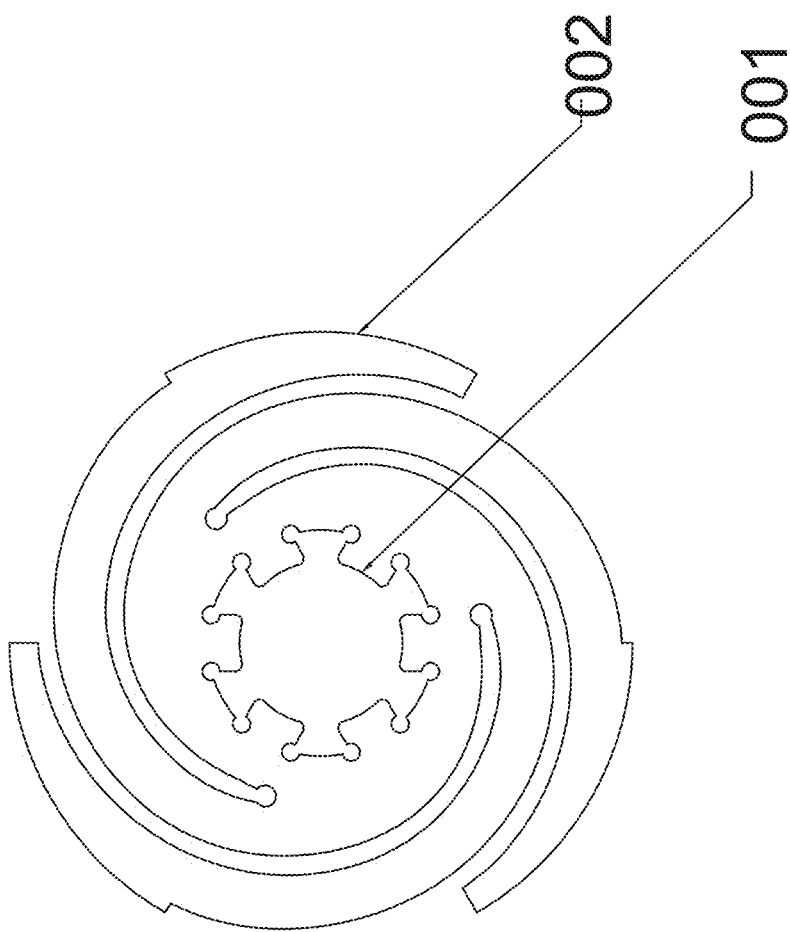

Said flexure spring aligns the conical surface of poppet 117 with pilot seat 110 and impedes poppet rotation while permitting free axial play of the poppet. Pilot seat 110 is received within the third cylindrical cavity of cage 119 where the first, second, and third cylindrical cavities are all precisely formed with respect to a common axis. FIG. 9B illustrates detail view of the features of flexure spring 118 described above.

As armature 7 moves in the direction of the pilot assembly, the push rod, pilot piston, and spring translate in unison, with the spring compressing between the opposing sliding members thus transferring electromotive force to the pilot poppet via direct contact with the poppet stem. The force thus imparted on pilot poppet 117 thru the pilot stem causes the poppet to move in the direction of the pilot seat 110, thus restricting flow of oil from the control volume which in turn increases pressure in control volume.

Figure 10:
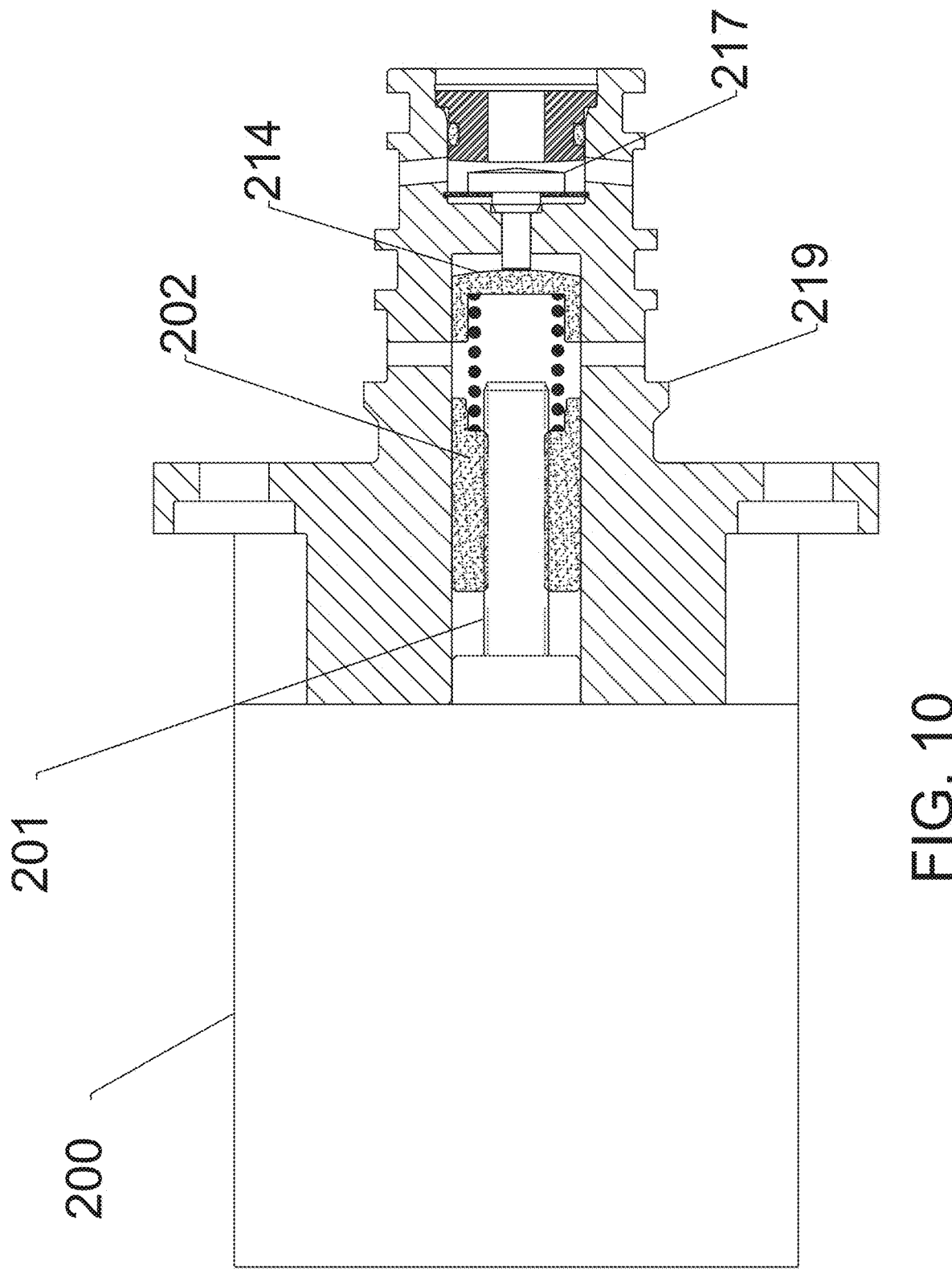
FIG. 10 is a detail view of an example stepper motor energized and pressure biased pilot valve including a poppet type metering element.

Referring now to FIG. 10, a detail view of an example stepper motor pilot valve is illustrated. In particular, the linear electromagnetic actuator that converts an electrical signal into a linear electromotive force is replaced by a rotary electromagnetic actuator 200. The rotary electromagnetic actuator 200 converts an electrical signal into angular position of a lead screw 201. In addition, a screw nut 202 functionally replaces the armature push rod of FIG. 9A. Internal threads of screw nut 202 engage with external threads of lead screw 201 in a manner to convert the rotational motion of lead screw 201 into linear translation of the screw nut. Various techniques may be employed to prevent screw nut 202 from rotating with respect to cage 219 due to the torque imparted by lead screw 201. In some aspects, the screw nut 202 shifts in the direction of the pilot poppet 217, a pilot piston 214, and spring translating in unison, with the spring compressing between the opposing sliding members thus transferring a linear force to the pilot poppet via direct contact with the poppet stem.

Figure 11A:
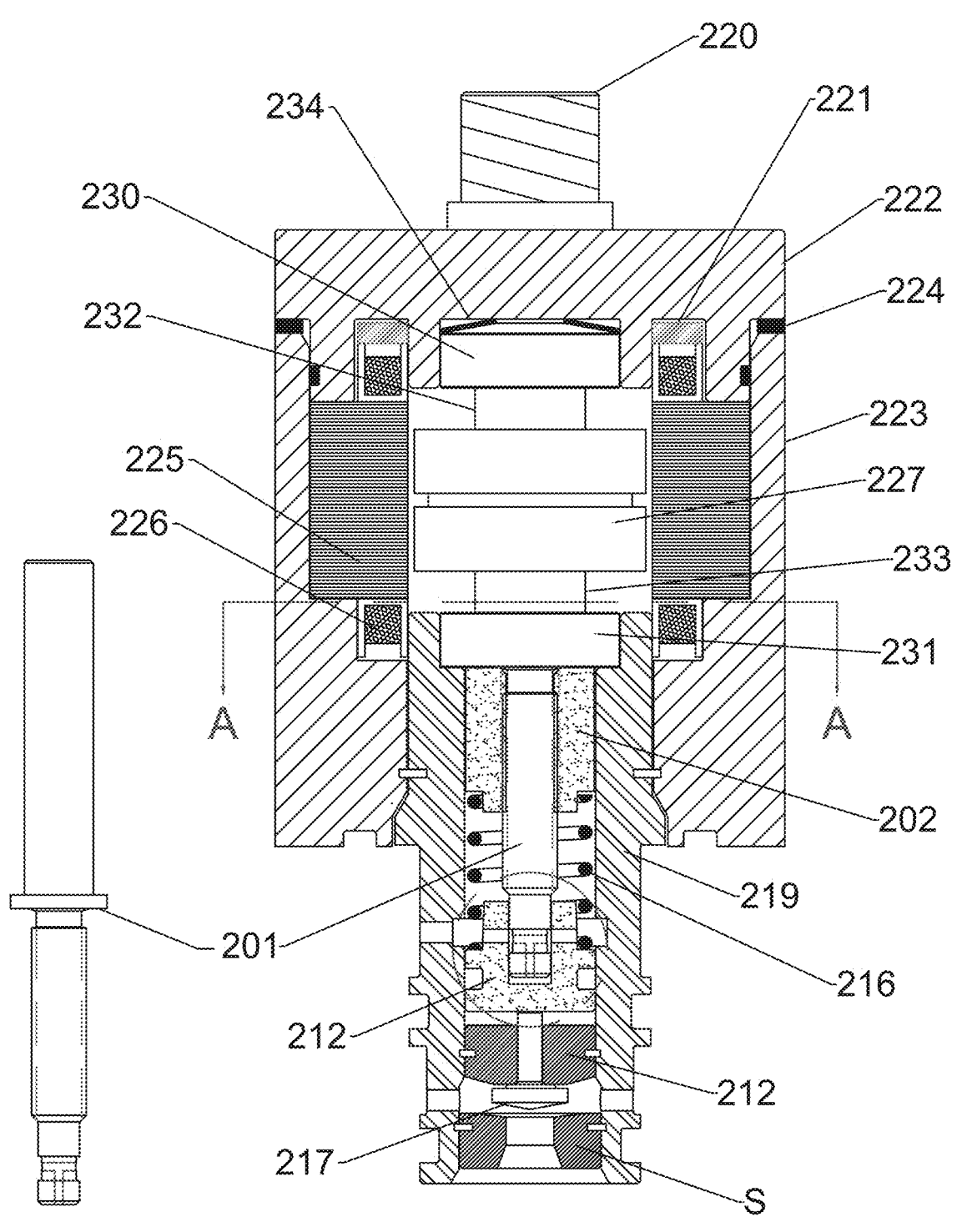
FIG. 11A is a detail view of another stepper motor energized pilot valve, including details of motor components integrated into the pilot valve structure.
Figure 11B:
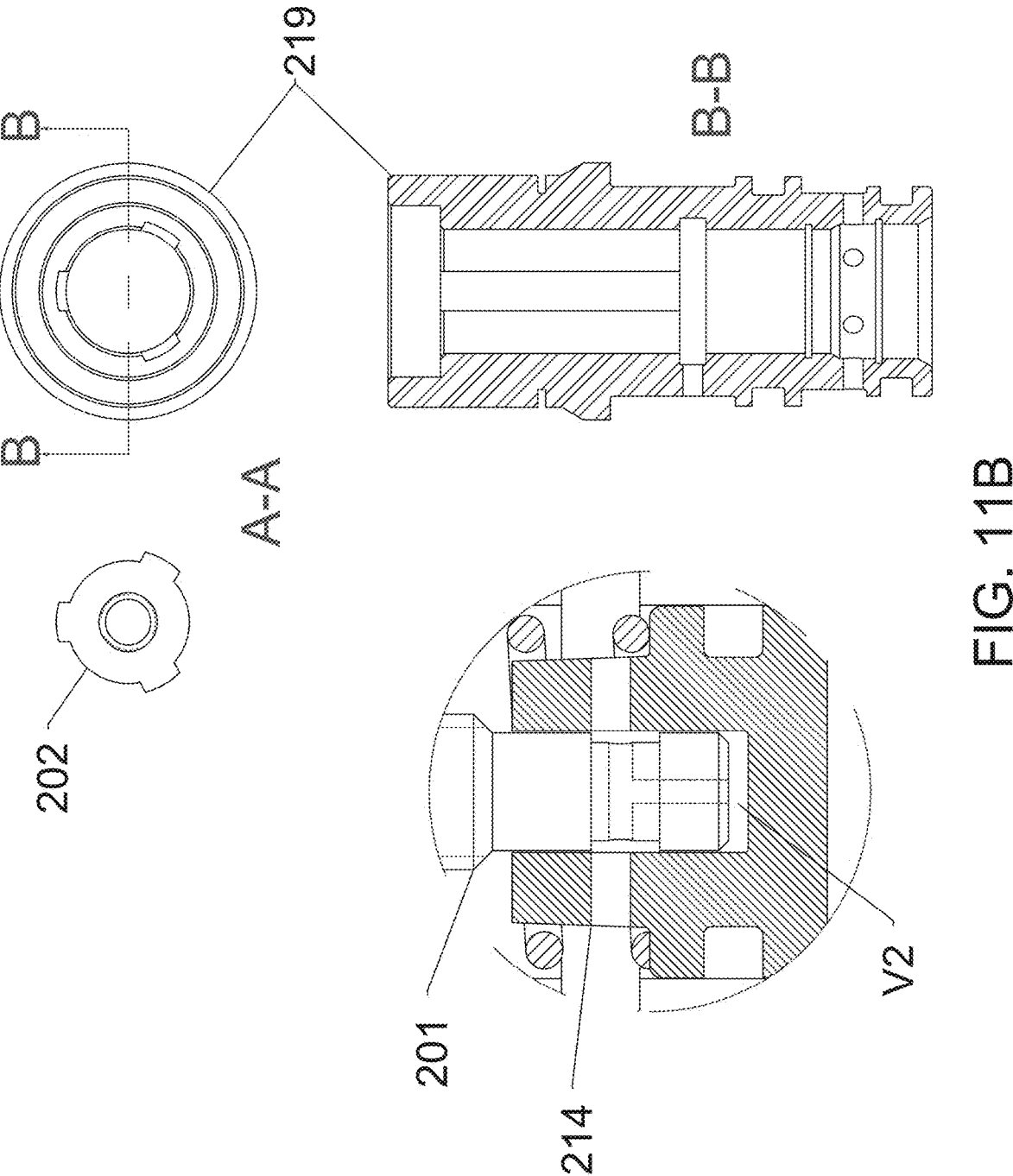
FIG. 11B illustrates additional aspects of the stepper motor pilot valve of FIG. 11A.
Figure 11C:
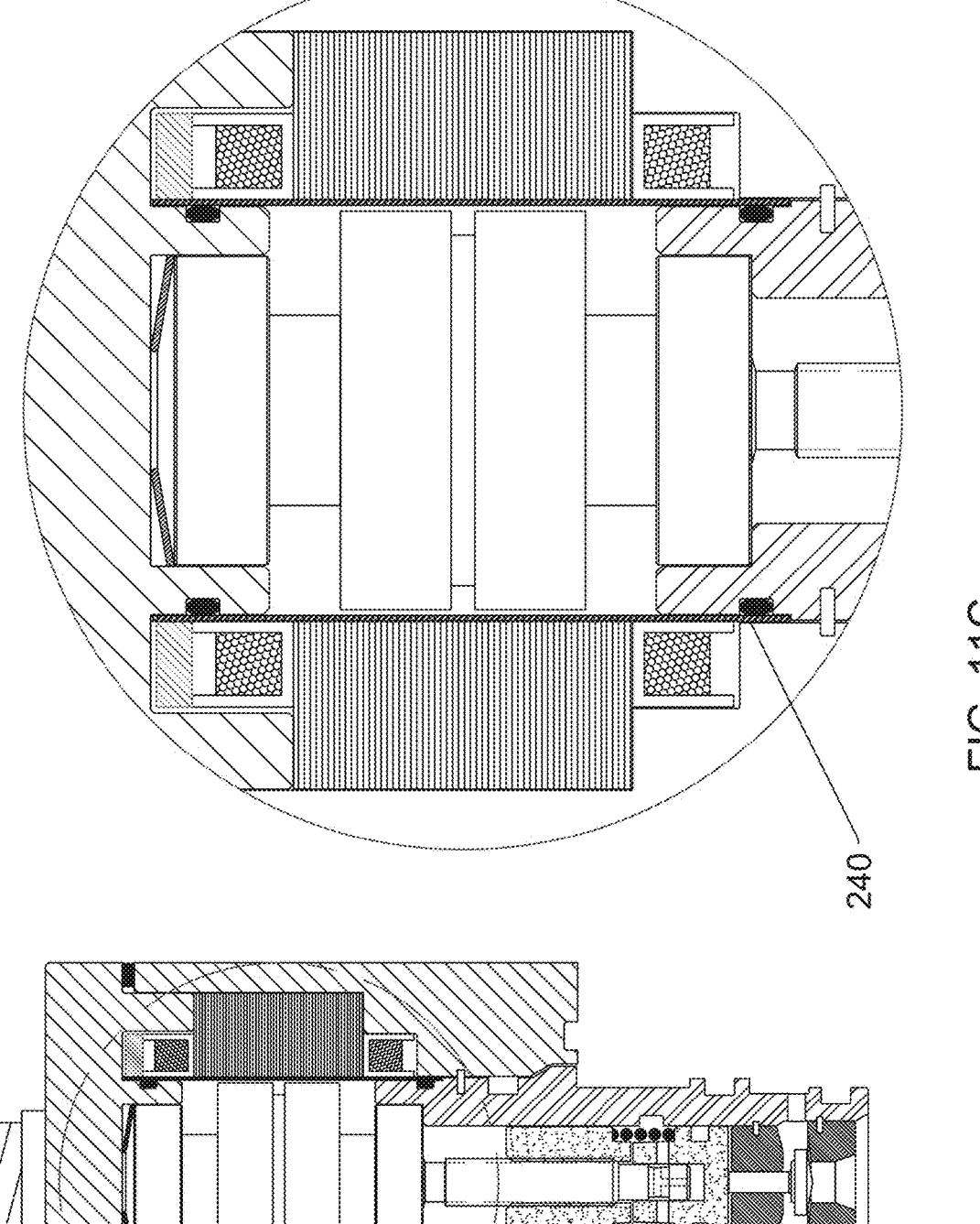
FIG. 11C is a detail view of the stepper motor pilot valve of FIG. 11A, shown in the energized condition.

Referring now to FIG. 11A-C, detail views are illustrated of another example stepper motor energized pilot valve in which the stepper motor components are disposed within a two-part "clamshell" motor housing. In this way, immersion of motor components in the filtered hydraulic fluid F provided while oil egress is prevented. Whereas both permanent magnet or variable reluctance type stepper motor architectures may also be employed, the non-limiting example illustrated in FIG. 11A is a two-phase hybrid type stepper motor architecture comprising eight (8) stator poles; with each stator pole having a plurality of teeth, commonly six (6), depending on the desired resolution of the stepper motor.

In some aspects, the stator assembly comprises a stack of magnetically permeable and electrically isolated steel laminations bonded together, and a toothed rotor subassembly 227 comprising dual rotor cups encapsulating an axially magnetized rare earth permanent magnet. A two-piece non-electrically conductive bobbin encapsulates the stator poles, which are wrapped in insulated copper wire resulting in a coil array 226 with eight (8) windings and two phases. An electrical board 221 is received by features on the upper stator bobbin, and rigidly disposed, providing a means to terminate the coil windings. A hermetically sealed connector 220 is received by an upper motor housing 222 and rigidly disposed, providing a leak proof fluid barrier. A flex cable, or related technology, communicates the motor electrical signals from electrical board 221 to connector 220.

A stator assembly 225 is received into a first cylindrical cavity formed within a lower motor housing 223, where the outer diameter of said stator assembly is slidably assembled within said first cylindrical cavity. An outer cylindrical feature formed in upper motor housing 222 is also received into the first cylindrical cavity of lower motor housing 223, such that the stator assembly is vertically positioned and rigidly disposed between opposing orthogonal surfaces formed in said upper motor housing 222 and said lower motor housing 223. All cylindrical features of lower motor housing 223 and upper motor housing 222 are coaxial. The upper and lower motor housings are joined together by a fastening means, such as threaded bolts. An elastically deformable gasket 224 disposed between secondary opposing orthogonal surfaces along the perimeters of the upper and lower motor housing prevents ingress of contaminants into the gap between motor housing sections. A pilot valve body 219, or "cage", is received into a second cylindrical cavity within lower motor housing 223, opposite of the upper motor housing, and is semi-rigidly disposed, being secured to lower motor housing 223 by an ID/OD retaining ring that permits small axial movements between pilot valve body 219 and lower motor housing 223. This arrangement precisely aligns the axis of pilot valve body 219 with the axis of stator assembly 225.

A lead screw motor shaft 201 includes a prolonged smooth diameter that sequentially receives a system of rotor parts, a shoulder, a length of ACME threads that receives a screw nut 202, and a terminal smooth diameter that externally receives and guides a cylindrical cavity of pilot piston 214. Said system of rotor parts, sequentially received by shaft 201, includes a lower ball bearing 231 with the inner race of said bearing abutting against the shaft shoulder when fully received, followed by a lower bearing spacer 233. The system of rotor parts further includes the rotor subassembly 227 which is rigidly coupled to the shaft via press-fit or bonding agent, followed by the upper bearing spacer 232 and an upper bearing 230. In some aspects, the inner race of said bearing is received by the shaft.

A cylindrical cavity formed within the upper motor housing receives the outer race of upper bearing 230, locating said bearing axially, whereas a spring washer 234 deployed in said cylindrical cavity and acting upon the upper bearing prevents vertical movement of the entire rotor and shaft assembly. A cylindrical cavity and shoulder (e.g., a counter bore) formed within pilot valve body 219 receive the outer race of lower bearing 231 and locate said bearing axially and vertically. This arrangement locates the entire rotor assembly axially and vertically with respect to the stator assembly axis, with the screw motor shaft extending into pilot valve housing 219, thus providing a consistent magnetic air gap and allowing the rotor to spin freely in precise axial alignment with stator assembly 225 and pilot valve body 219. Additionally, the pilot valve housing receives a screw nut 202, energizing spring 216, pilot piston 214, and poppet 217 all moveably disposed therein. Poppet guide 212 and poppet seat S are also received by pilot valve body 219 and rigidly disposed by means of a retaining ring, other fastener, or press fit.

During operation, screw nut 202, pilot piston 214, and poppet 217 translate along the pilot valve body axis in response to fluid pressure and stepper motor inputs, with the pilot piston and poppet traveling in unison, and energizing spring 216 captured between screw nut 202 and pilot piston 214. The relative distance between screw nut 202 and pilot piston 214 determines the magnitude of energizing spring compression force under the principle that decreasing relative distance corresponds to increased force. Translation of poppet 217 is axially guided by poppet guide 212. As discussed above, the energizing spring force acts to close poppet 217 in the direction of poppet seat S.

Further, and as discussed above, a pressure bias force generated by fluid pressure F acting on the minor area of the pilot metering element (e.g., the 'stem' of poppet 217, equivalent to pilot pin 15 in FIG. 2), to move poppet 217 in the direction of poppet seat S, and the major diameter of poppet 217 is acted upon by control pressure C to lift the poppet from poppet seat S. Screw nut 202 and pilot piston 214 are pressure balanced by filtered fluid pressure F in the equilibrium condition. However, dynamic motion of pilot piston 214, and by association poppet 217, are dampened by a volume V2 of fluid created between the cylindrical terminus of lead screw motor shaft 201 and the receiving cylindrical cavity of pilot piston 214 (see FIG. 11B). Small passages, illustrated by hidden lines, formed within the motor shaft allow for restricted flow of fluid into and out of volume V2.

The physical methods by which a stepper motor converts an electrical input into rotational motion, and by which a lead screw converts rotational motion to linear motion, can be any suitable method. It is contemplated that discrete current pulse inputs to the stator coil array effect the direction and number of discrete "steps" in rotational position—conventionally 1.8° or 0.9° per pulse—and that lead screw motor shaft 201 converts this rotational motion of rotor assembly 227 into linear motion via screw nut 202. Longitudinal features formed in the outer surface of screw nut 202, and inner cylindrical surface of pilot valve body 219 (see FIG. 11B) prevent the screw nut from rotating, and thus convert torque from lead screw motor shaft 201 into linear motion.

By this method, the number and direction of current pulse inputs to the stator coil array determines the vertical position of the screw nut along the axis of pilot valve body 219, and thus determines the spring energizing force transferred to poppet 217 via pilot piston 214. Care must be taken in component design such that the total travel of screw nut 202 is substantially larger than maximum travel of poppet 217. FIG. 11C illustrates near full displacement of screw nut 202, demonstrating the compression of energizing spring 216.

An alternative, but less preferable, embodiment would reverse the operation of the lead screw, and lead screw nut. In this embodiment, said screw nut would be received by the rotor assembly, and rigidly disposed such that the nut rotates with the rotor. The lead screw is then received by said screw nut, and prevented from rotating but any number of suitable methods known to the art. Consequently, rotational motion of said screw nut would be converted into linear motion of said screw.

Movement of poppet 217 in the direction of the pilot seat S restricts flow of oil from control volume V6 to low pressure drain D, and thus increases pressure in control volume V6. The poppet reaches equilibrium when the control pressure C working against the area of the poppet seat S is balanced by the force imparted upon the poppet by the energizing spring 216 and the pressure bias force.

$$P_{control}Area_{poppet\ seat}=F_{spring}+P_{supply}Area_{pin}$$

Still referring to FIG. 11C, a detail view is illustrated of the stepper motor pilot valve of FIG. 11A in an energized condition. The stepper motor pilot valve includes a sleeve 240 formed from a material with non-magnetic (e.g., non-electrically conductive, poorly electrically conductive) properties. The upper open end of the sleeve is received by a cylindrical surface formed in the upper motor housing, wherein the joint between said sleeve and said motor housing surface is sealed. Further, the pilot valve body receives the lower open end of said non-magnetic sleeve, wherein the joint between said sleeve and said valve body is sealed. This arrangement defines a fluid barrier between the stator assembly and the rotor assembly resulting in the immersion of the rotor in hydraulic fluid, but not the stator.

As used herein, unless otherwise specified or limited, directional terms are presented only with regard to the particular embodiment and perspective described. For example, reference to features or directions as "horizontal," "vertical," "front," "rear," "left," "right," "upper," "lower," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features for a particular embodiment, regardless of the absolute orientation of the embodiment (or relative orientation relative to environmental structures). "Lateral" and derivatives thereof generally indicate directions that are generally perpendicular to a vertical direction for a relevant reference frame.

Also as used herein, ordinal numbers are used for convenience of presentation only and are generally presented in an order that corresponds to the order in which particular features are introduced in the relevant discussion. Accordingly, for example, a "first" feature may not necessarily have any required structural or sequential relationship to a "second" feature, and so on. Further, similar features may be referred to in different portions of the discussion by different ordinal numbers. For example, a particular feature may be referred to in some discussion as a "first" feature, while a similar or substantially identical feature may be referred to in other discussion as a "third" feature, and so on.

Also as used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Any of the embodiments described herein may be modified to include any of the structures or methodologies disclosed in connection with different embodiments. Further, the present disclosure is not limited to the dispensing systems of the type specifically shown. Still further, the methods and systems of any of the embodiments disclosed herein may be modified to work with any type of volatile material dispenser.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use aspects of the disclosure. The exclusive rights to all modifications which come within the scope of the appended claims are reserved.

I claim:

1. A hydraulic valve comprising:
    a valve body including:
        a first port for receiving fluid from a high-pressure source;
        a second port to drain the fluid to a low-pressure reservoir; and
        a common pressure rail in fluid communication with the first port;
    a pilot assembly at least partially disposed within the valve body and defining a first volume in fluid communication with the common pressure rail, the pilot assembly including:
        an electromechanical actuator that converts an electrical signal into mechanical force and motion;
        a first fluid metering element; and
        an energizing spring, wherein said spring is arranged so as to transfer the mechanical force produced by said electromechanical actuator to said first fluid metering element via an energizing spring force; and
    a second fluid metering element, substantially larger than said first fluid metering element, received into said valve body and moveably disposed, the second fluid metering element at least partially defining a control volume and a second volume, the control volume disposed between the first fluid metering element and the second fluid metering element, the second volume disposed opposite the control volume, the second volume in fluid communication with the common pressure rail,
    wherein, said first fluid metering element defines a variable fluid path from the control volume to the second port,
    wherein, a first end of the energizing spring is operatively coupled to the electromechanical actuator, and an opposing end of said spring is operatively coupled to said first fluid metering element;
    wherein a first surface of the first fluid metering element receives a first pressure force opposing said energizing spring force from fluid within the control volume,
    wherein, a second surface, operatively coupled to said first fluid metering element, receives a second pressure force assisting said energizing spring force from fluid within the first volume,
    wherein, a third surface of the second fluid metering element receives a third pressure force from fluid within the control volume, and
    wherein, a fourth surface of the second fluid metering element receives a fourth pressure force opposing the third pressure force from fluid within the second volume.

2. The hydraulic valve of claim 1 further comprising a piston, wherein said piston receives one end of said energizing spring, and
    wherein said piston is operatively coupled to said first fluid metering element.

3. The hydraulic valve of claim 2 further comprising a first fluid path that restrictively communicates fluid from said common pressure rail to said first volume,
    wherein said first volume is defined in part by a position of said piston, and
    wherein motion of said piston induces a pressure differential across said first fluid path to create a damping effect.

4. The hydraulic valve of claim 3, wherein said first volume is additionally defined in part by a position of said first fluid metering element, wherein motion of said first fluid metering element further induces a pressure differential across the first fluid path.

5. The hydraulic valve of claim 2 further comprising a second fluid path that is configured to restrictively communicate fluid from said common pressure rail to the first volume, wherein the first volume is defined in part by a position of said first fluid metering element, and wherein motion of said first fluid metering element induces a pressure differential across said second fluid path to create a damping effect.

6. The hydraulic valve of claim 5, wherein said second surface partially defines the first volume.

7. The hydraulic valve of claim 1, further comprising a sixth fluid path, configured to restrictively communicate fluid from said common pressure rail to the second volume, wherein the second volume is defined in part by a position of said second fluid metering element, and wherein motion of said second fluid metering element induces a pressure differential across the sixth fluid path to create a damping effect.

8. The hydraulic valve of claim 7, wherein said fourth surface partially defines said second volume.

9. The hydraulic valve of claim 7, wherein said valve body includes a tank port in fluid communication with a low-pressure tank and a working port, and wherein a pressure of fluid in working port is variable during normal valve operation, being derived from a pressure from fluid in the tank port and a pressure from the fluid in the first port.

10. The hydraulic valve of claim 9, wherein said second fluid metering element is a spool.

11. The hydraulic valve of claim 10, wherein said spool includes a plurality of lands, said lands cooperatively defining a bearing surface for axial movement, and wherein said spool further includes a plurality of circumferentially deployed slots configured to regulate fluid flow into and out of said working port.

12. The hydraulic valve of claim 11, wherein said spool is configured to block communication of fluid from said tank port to said working port, and from said working port to said first port when the spool is in a partially energized neutral position.

13. The hydraulic valve of claim 11, wherein said spool is configured to permit restrictive communication of fluid from said tank port to said working port, and from said working port to said first port when the spool is in a partially energized neutral position.

14. The hydraulic valve of claim 11, wherein said spool permits communication of fluid from said tank port to said working port, and from said working port to said first port when the spool is in a partially energized neutral position.

15. The hydraulic valve of claim 11, wherein a fifth surface of said fluid second metering element receives a fifth pressure force from fluid within the working port, the fifth pressure force opposing the third pressure force.

16. The hydraulic valve of claim 1, wherein surface areas of said first, second, third, and fourth surfaces are related by:

$$\frac{\text{Area}_{surface3}}{\text{Area}_{surface4}} = \frac{\text{Area}_{surface1}}{\text{Area}_{surface2}}$$

17. The hydraulic valve of claim 1 further comprising a filter, wherein said filter receives an inflow of pressurized fluid from the first port and communicates an outflow of filtered fluid to said common pressure rail.

18. The hydraulic valve of claim 1 further comprising a seventh fluid path conceived to restrictively communicate fluid from said common pressure rail to the control volume.

19. The hydraulic valve of claim 18, wherein said seventh fluid path is blocked, partially blocked, or further restricted when said second fluid metering element is in a de-energized state.

20. The hydraulic valve of claim 1, wherein said first fluid metering element is a poppet.

21. The hydraulic valve of claim 20, further comprising a poppet seat, wherein said poppet seat receives said poppet, and wherein a frustum formed at an interface between said poppet and said poppet seat defines said first surface.

22. The hydraulic valve of claim 21 further comprising a flat pilot spring, wherein said flat pilot spring is arranged such that it suspends said poppet at a fixed distance from said poppet seat when the valve is in a de-energized state.

23. The hydraulic valve of claim 21 further comprising a stem, wherein said stem is operatively coupled to said poppet, and wherein said second surface is a feature of said stem, said second surface being orthogonal to an axis of said stem.

24. The hydraulic valve of claim 1 further comprising a pilot valve body with a bore, wherein said pilot valve body is received by said valve body and rigidly disposed, and wherein said pilot valve body receives said first fluid metering element and a piston.

25. The hydraulic valve of claim 24, wherein said pilot valve body further receives said energizing spring, a rod, and said piston.

26. The hydraulic valve of claim 24, wherein said pilot valve body includes a plurality of apertures to provide for fluid flow, wherein said pilot valve body further includes a plurality of pilot ports, and wherein a plurality of seals disposed along an outer surface of said pilot valve body prevent leakage of fluid between the pilot ports.

27. The hydraulic valve of claim 26, wherein a first pilot port of the plurality of pilot ports freely communicates with said control volume, and wherein a second pilot port of the plurality of pilot ports freely communicates with the second port.

28. The hydraulic valve of claim 26, wherein a third pilot port of the plurality of pilot ports freely communicates with said common pressure rail.

29. The hydraulic valve of claim 28, further comprising a pilot volume immediately below a pilot seat, wherein said first surface is redefined such that it receives a sixth pressure force from fluid in pilot volume, wherein an eighth fluid path restrictively communicates fluid between said pilot volume and the control volume, and wherein a ninth fluid path restrictively communicates fluid between said pilot volume and said common pressure rail, and wherein a fourth pilot port of the plurality of pilot ports freely communicates with said common pressure rail.

30. The hydraulic valve of claim 1, wherein said electromechanical actuator is a linear proportional solenoid including a linearly moveable armature element.

31. The hydraulic valve of claim 30, further comprising a third fluid path configured to restrictively communicate fluid from said common pressure rail to a third volume defined in part by a position of said linearly moveable armature element, wherein motion of said linearly moveable armature element induces a pressure differential across said third fluid path to create a damping effect.

32. The hydraulic valve of claim 31 further comprising a rod, wherein said rod receives one end of said energizing spring, and wherein said rod is operatively coupled to said linearly moveable armature element.

33. The hydraulic valve of claim 32 further comprising a fourth fluid path through said rod, configured to restrictively communicate fluid from said common pressure rail to a fourth damping volume of fluid defined in part by the position of the linearly moveable armature element, wherein motion of said linearly moveable armature element induces a pressure differential across said fourth fluid path to create a damping effect.

34. The hydraulic valve of claim 33, further comprising a fifth fluid path through said rod, configured to freely communicate fluid with said common pressure rail.

\* \* \* \* \*